US012529450B2

(12) United States Patent
Sullivan et al.

(10) Patent No.: US 12,529,450 B2
(45) Date of Patent: Jan. 20, 2026

(54) STITCHED POLYMER MATRIX COMPOSITES USING BARRIER LAYERS FOR CRYOGENIC APPLICATIONS AND METHODS OF MAKING THE SAME

(71) Applicant: Mississippi State University, Starkville, MS (US)

(72) Inventors: Rani Warsi Sullivan, Starkville, MS (US); Shuvam Saha, Starkville, MS (US); Myles Baker, Long Beach, CA (US); Adam Przekop, Yorktown, VA (US)

(73) Assignees: Mississippi State University, Starkville, MS (US); United States of America Represented by the Administrator of the National Aeronautics and Space Administration, Washington, DC (US)

( * ) Notice: Subject to any disclaimer, the term of this patent is extended or adjusted under 35 U.S.C. 154(b) by 321 days.

(21) Appl. No.: 17/568,642

(22) Filed: Jan. 4, 2022

(65) Prior Publication Data
US 2022/0235905 A1    Jul. 28, 2022

Related U.S. Application Data

(60) Provisional application No. 63/133,576, filed on Jan. 4, 2021.

(51) Int. Cl.
*B29B 11/16* (2006.01)
*B29C 70/00* (2006.01)
(Continued)

(52) U.S. Cl.
CPC ............... *F17C 1/16* (2013.01); *B29B 11/16* (2013.01); *B29C 70/003* (2021.05); *B29C 70/48* (2013.01);
(Continued)

(58) Field of Classification Search
CPC ....... B29C 65/62; B29C 65/72; B29C 70/443; B29C 70/48; B32B 5/06; B32B 5/073;
(Continued)

(56) References Cited

U.S. PATENT DOCUMENTS 5,419,139 A * 5/1995 Blum ................. B32B 7/12
220/560.04
8,312,827 B1 * 11/2012 Free ................... B29C 70/24
112/475.08
(Continued)

OTHER PUBLICATIONS

Textile Glossary, Celanese Acetate, copyright 2001 (Year: 2001).*
(Continued)

*Primary Examiner* — Jennifer A Steele
(74) *Attorney, Agent, or Firm* — Stites & Harbison PLLC; Richard S. Myers, Jr.; Patrick M. Torre

(57) ABSTRACT

Provided herein are polymer matrix composites, articles including the polymer matrix composites, and methods of forming the polymer matrix composites. The polymer matrix composite includes a stitched composite and a hybrid barrier layer incorporated within the stitched composite, the hybrid barrier layer including a thin ply and a nanographene dispersed resin. The article includes a high-pressure composite cryogenic tank including the polymer matrix composite. The method includes positioning a dry thin ply between composite plies, stitching the composite plies to form a stitched preform, dispersing nanographene into the resin, and infusing the stitched preform with the modified resin.

19 Claims, 19 Drawing Sheets

(51) Int. Cl.
　　　*B29C 70/48*　　　(2006.01)
　　　*B29K 105/08*　　(2006.01)
　　　*B29K 105/16*　　(2006.01)
　　　*B29K 307/04*　　(2006.01)
　　　*B29K 507/04*　　(2006.01)
　　　*B32B 5/06*　　　(2006.01)
　　　*B32B 5/26*　　　(2006.01)
　　　*F17C 1/16*　　　(2006.01)
　　　*B29K 63/00*　　(2006.01)
　　　*B29L 31/00*　　(2006.01)

(52) U.S. Cl.
　　　CPC ............... *B32B 5/073* (2021.05); *B32B 5/26* (2013.01); *B29K 2063/00* (2013.01); *B29K 2105/0809* (2013.01); *B29K 2105/162* (2013.01); *B29K 2307/04* (2013.01); *B29K 2313/00* (2013.01); *B29K 2507/04* (2013.01); *B29L 2031/7156* (2013.01); *B32B 2260/023* (2013.01); *B32B 2264/108* (2013.01); *F17C 2203/0663* (2013.01); *F17C 2203/0697* (2013.01); *F17C 2209/2109* (2013.01)

(58) Field of Classification Search
　　　CPC ....... B32B 2264/108; F17C 2203/0663; F17C 2203/0697; F17C 2209/2109; B29K 2063/00; B29K 2105/0809; B29K 2105/162; B29K 2307/04; B29K 2313/00; B29K 2507/04; B29L 2031/7156; B29B 11/16
　　　See application file for complete search history.

(56) References Cited

U.S. PATENT DOCUMENTS

| | | | | |
|---|---|---|---|---|
| 2012/0177872 A1* | 7/2012 | Tsai | ............. | B32B 5/28 428/113 |
| 2015/0030805 A1* | 1/2015 | Tsai | ............. | B32B 5/06 428/110 |
| 2015/0266268 A1* | 9/2015 | Coxon | ............. | B29C 65/40 156/307.1 |
| 2015/0316207 A1* | 11/2015 | Laney | ............. | F17C 1/00 427/236 |
| 2015/0344666 A1* | 12/2015 | Macosko | ............. | B32B 27/12 428/458 |

OTHER PUBLICATIONS

Textile Glossary (Year: 2001).*
Rivers, Kevin H. Cyclic Cryogenic Testing of an X-33 / RLV Liquid Oxygen Tank Concept. Hampton, Virginia: 1999.
Robinson MJ. Determination of Allowable Hydrogen Permeation Rates for Launch Vehicle Propellant Tanks. J Spacecr Rockets 2008;45:82-9.
Nettles AT. Permeability Testing of Composite Material Adhesive Bonds for the DC-XA Composite Feedline Program. Huntsville, Alabama: 1995.
Bechel VT, Kim RY. Damage trends in cryogenically cycled carbon/polymer composites. Compos Sci Technol 2004;64:1773-84.
Bechel V, Kim R, Donaldson S. Composites Containing Barrier Layers for Reduced Permeability at Cryogenic Temperature. 47th AIAA/ASME/ASCE/AHS/ASC Structures, Structural Dynamics, and Materials Conference, Rhode Island: American Institute of Aeronautics and Astronautics; 2006.
Bechel VT, Negilski M, James J. Limiting the permeability of composites for cryogenic applications. Compos Sci Technol 2006;66:2284-95.
Bechel VT, Fredin MB, Donaldson SL, Kim RY, Camping JD. Effect of stacking sequence on micro-cracking in a cryogenically cycled carbon/bismaleimide composite. Compos Part A Appl Sci Manuf 2003;34:663-72.
Rivers HK, Sikora JG, Sankaran SN. Detection of Hydrogen Leakage in a Composite Sandwich Structure at Cryogenic Temperature. J Spacecr Rockets 2002;39:452-9.
Gates T, Grenoble R, Whitley K. Permeability and Life-time Durability of Polymer Matrix Composites for Cryogenic Fuel Tanks. 45th AIAA/ASME/ASCE/AHS/ASC Structures, Structural Dynamics & Materials Conference, American Institute of Aeronautics and Astronautics; 2004.
Mallick K, Cronin J, Ryan K, Arzberger S, Munshi N, Paul C, et al. An Integrated Systematic Approach to Linerless Composite Tank Development. 46th AIAA/ASME/ASCE/AHS/ASC Structures, Structural Dynamics and Materials Conference, American Institute of Aeronautics and Astronautics; 2005.
Hamori H, Kumazawa H, Higuchi R, Yokozeki T. Gas permeability of CFRP cross-ply laminates with thin-ply barrier layers under cryogenic and biaxial loading conditions. Compos Struct 2020;245:112326.
Kumazawa H, Aoki T, Susuki I. Influence of stacking sequence on leakage characteristics through CFRP composite laminates. Compos Sci Technol 2006;66:2107-15.
Kumazawa H, Aoki T, Susuki I. Analysis and Experiment of Gas Leakage Through Composite Laminates for Propellant Tanks. AIAA Journal 2003;41:2037-44.
Yokozeki T, Ogasawara T, Ishikawa T. Evaluation of gas leakage through composite laminates with multilayer matrix cracks: Cracking angle effects. Compos Sci Technol 2006;66:2815-24.
Yokozeki T, Aoki T, Ishikawa T. Experimental Cryogenic Gas Leakage Through Damaged Composite Laminates for Propellant Tank Application. J Spacecr Rockets 2005;42:363-6.
Yokozeki T, Kuroda A, Yoshimura A, Ogasawara T, Aoki T. Permeation-after-impact Properties of CFRP Laminates for Use on Propellant Tank. Transactions of the Japan Society for Aeronautical and Space Sciences, Space Technology Japan 2009;7:Pc_19-Pc_23.
Saha S, Sullivan RW, Baker ML. Gas permeability of three-dimensional stitched carbon/epoxy composites for cryogenic applications. Compos B Eng 2021;216:108847.
Saha S, Sullivan RW, Baker ML. Gas permeability mitigation of cryogenically cycled stitched composites using thin plies. Compos Struct 2023;304:116352.
Cui, Y., Kundalwal, S. I., and Kumar, S., 2016, "Gas Barrier Performance of Graphene/Polymer Nanocomposites," Carbon N Y, 98, pp. 313-333.

* cited by examiner

101

| Tank | Maximum Allowable Permeability |
|---|---|
| | (scc/s/cm²) |
| Delta IV Upper Stages | |
| Extended Mission | 0.00574 |
| Heavy to GTO (Eastern Range) | 0.0332 |
| M+ (5,2) to GTO (Eastern Range) | 0.0336 |
| M+ (5,4) to GTO (Western Range) | 0.0508 |
| Delta IV CBC | 0.487 |
| SLI Reusable Booster | 0.868 |

STITCHED POLYMER MATRIX COMPOSITES USING BARRIER LAYERS FOR CRYOGENIC APPLICATIONS AND METHODS OF MAKING THE SAME

RELATED APPLICATIONS

This application claims priority from U.S. Provisional Application Ser. No. 63/133,576, filed Jan. 4, 2021, the entire disclosure of which is incorporated herein by this reference.

GOVERNMENT INTEREST

This invention was made with government support under grant number 80NSSC19C0353 awarded by the National Aeronautics and Space Administration (NASA). The government has certain rights in the invention.

TECHNICAL FIELD

The presently-disclosed subject matter generally relates to the field of composite materials. More specifically, the presently-disclosed subject matter relates to novel materials, methods, processes, and apparatus for making new hybrid barrier layer materials comprising stitched composites incorporated with thin plies and nanographene-strengthened resin and methods to manufacture such composite layers for applications including cryogenic tanks and structures.

BACKGROUND

Lightweight liquid hydrogen or oxygen tanks are critical components of space launch vehicles. To be economically feasible, one of the objectives for reusable launch vehicles is structural weight reduction while maintaining overall strength. While this can be accomplished by using polymer matrix composites (PMCs), cryogenic propellant tanks undergo a combination of large thermal and mechanical stresses, which lead to transverse micro-cracks that initiate delaminations in the PMC tanks. The network of micro-cracks combined with delaminations form pathways for cryogen leakage, resulting in a hazardous situation for the structure and/or vehicle. Thus, negligible gas permeation through the walls of cryogen tanks is a requirement for reusable and multiple-mission air vehicles. For more than two decades, metal liners have been the choice of the industry to reduce gas permeation in polymer matrix composites. However, a mismatch in the coefficients of thermal expansion (CTE) of the metal and the polymer matrix results in debonding of the liner from the tank, leading to excessive permeation.

Various attempts have been made to address the debonding and excessive permeation seen with metal liners. For example, polymer liners such as thermoplastic liners have shown promise in resisting micro cracking at cryogenic temperatures. Alternatively, liner-less designs have included the use of woven textile material to improve drapability and wetting of fibers in the matrix for a stronger adhesion. Nanocomponents (such as nano-clay, nano-silica, or carbon nanotubes) have also been successfully used to reduce gas permeability of certain polymers. However, nanocomponents are typically never used in VARTM process due to issues of agglomeration and filtration. In another attempt, thin plies (prepregs) have been embedded within unstitched laminates to mitigate or stop the progression of micro-crack networks. Prepregs are reinforced composite fiber or fabric materials pre-impregnated with a thermoplastic or thermosetting resin. Due to their very low cured thickness, these prepregs or thin plies do not provide the necessary energy for a crack to propagate. As such, unstitched composites, generally prepregs, have been used for fabrication of various structures including cryogenic fuel tanks.

Automated fiber placement (AFP) machines are often used to lay prepregs on a spinning mandrel to form a cylindrical dome-shaped structure for cryotanks. Once the tank body is cured (in an autoclave or in an oven), external structures such as skirts/flutes are attached separately by means of adhesive bonding. However, this manufacturing technology requires multiple cures and several non-destructive evaluations at each stage of the fabrication process to produce a completely assembled cryotank. Moreover, the bonded joints for the flutes and/or skirts must withstand very large peel stresses, which form the primary failure mechanism in these bonds.

Accordingly, there remains a need for materials that reduce or eliminate gas permeation in cryogenic applications without compromising overall component strength.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

In some embodiments, the presently-disclosed subject matter is directed to a stitched polymer matrix composite, the polymer matrix composite including a stitched composite and a hybrid barrier layer incorporated within the stitched composite, the hybrid barrier layer including a thin ply and a nanographene reinforced resin. In some embodiments, the stitched composite includes a non-crimp fabric. In some embodiments, the non-crimp fabric is a biaxial non-crimp fabric. In some embodiments, the non-crimp fabric includes an intermediate modulus. In some embodiments, the resin comprises an out-of-autoclave epoxy. In some embodiments, the resin comprises nanographene mixed with an epoxy. In some embodiments, the resin includes a nanographene volume fraction of about 0.5% to about 10.0% by weight of the resin. In some embodiments, the thin ply is incorporated between plies of the stitched composite. In some embodiments, the thin ply is incorporated between a second composite ply from the surface of the polymer matrix composite and a third composite ply from the surface of the polymer matrix composite. In some embodiments, the thin ply is incorporated at a midplane of the stitched composite. In some embodiments, the thin ply is a dry thin ply. In some embodiments, the polymer matrix composite further includes at least one additional thin ply. In some embodiments, at least one additional thin ply is incorporated between plies of the stitched composite. In some embodiments, nanographene dispersed epoxy is infused into stitched carbon preforms with thin plies embedded within them.

Also provided herein, in some embodiments, is a high-pressure composite cryogenic tank including the polymer matrix composite. In some embodiments, the cryogenic tank includes a unitized structure.

Further provided herein, in some embodiments, is a method of fabricating the polymer matrix composite, the method including positioning a dry thin ply between composite plies, stitching the composite plies with thin plies to form a stitched preform, and infusing the stitched preform with a resin. In some embodiments, the composite plies include non-crimp fabric. In some embodiments, the resin includes nanographene-dispersed resin, and a method of dispersing nanographene into the resin and infusing stitched composite preforms with the modified resin is provided. In some embodiments, infusing the stitched preform with the resin comprises vacuum assisted resin transfer molding.

Further features and advantages of the presently-disclosed subject matter will become evident to those of ordinary skill in the art after a study of the description, figures, and non-limiting examples in this document.

DESCRIPTION OF EXEMPLARY EMBODIMENTS

Figure 1:
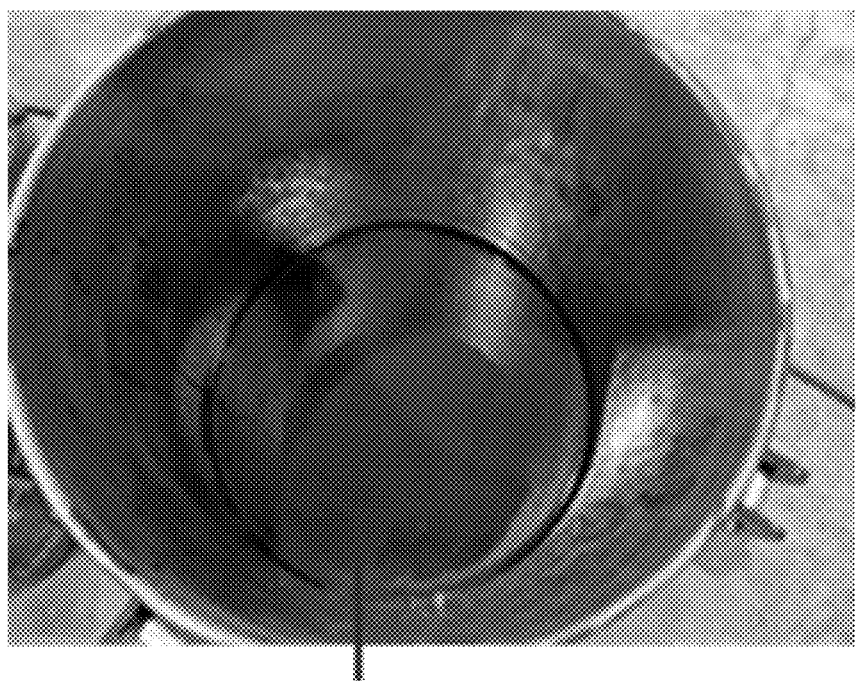
FIG. 1 shows GNP dispersed Hexflow 1078 prior to degassing.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter. Unless defined otherwise, all technical and scientific terms used herein have the same meaning as is commonly understood by one of skill in the art to which the invention(s) belong. Where reference is made to a URL or other such identifier or address, it is understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise. When open-ended terms such as "including" or 'including, but not limited to" are used, there may be other non-enumerated members of a list that would be suitable for the making, using or sale of any embodiment thereof.

Following long-standing patent law convention, the terms "a," "an," and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter includes a novel hybrid composite material. In some embodiments, the hybrid composite material includes a stitched composite with one or more thin plies and nanographene dispersed resin incorporated therein. In some embodiments, the stitched composite includes two or more stitched plies of a fabric or non-crimp fabric (NCF). Any suitable fabric or NCF may be used, such as, but not limited to, intermediate modulus, standard modulus, high strength, uniaxial, biaxial, triaxial, quadraxial, or a combination thereof. Additionally, the hybrid composite material may include any suitable number of stitched composite plies, such as, but not limited to, between 2 and 16, between 4 and 16, between 8 and 16, between 10 and 14, or any suitable combination, sub-combination, range, or sub-range thereof. In one embodiment, for example, the stitched composite includes four biaxial intermediate modulus NCF. As will be appreciated by those skilled in the art, a uniaxial NCF has 1 ply, a biaxial NCF has 2 plies, a triaxial has 3 plies, a quadraxial NCF has 4 plies, and so on. Each NCF includes any suitable fiber orientation. For example, in one embodiment, a biaxial NCF includes a first ply with an orientation of +45 degrees and a second ply with an orientation of −45 degrees, which is represented as (+45/−45). Although the stitched composite is described herein primarily with respect to biaxial (+45/−45) intermediate modulus NCF, as will be appreciated by those skilled in the art, the disclosure is not so limited and may include any other suitable number of fiber layers, fiber orientations, moduli, quasi-isotropic, or combinations thereof.

The resin includes any suitable resin for infusion into the stitched composite. In some embodiments, the resin is an out-of-autoclave epoxy, which may be infused within the stitched composite without the use of an autoclave (e.g., vacuum assisted resin transfer molding (VARTM)). Additionally or alternatively, in some embodiments, the resin includes a nanographene-toughened resin. In some embodiments, the nanographene-toughened resin includes nanographene mixed with an uncured epoxy resin. In some embodiments, the nanographene is mixed with the uncured epoxy resin at a volume fraction of about 0.5% to about 10.0% nanographene by weight of the uncured resin. Other suitable volume fractions of the nanographene-toughened resin include, but are not limited to, about 0.5% to about 9.5%, about 0.5% to about 9.0%, about 0.5% to about 8.5%, about 0.5% to about 8.0%, about 0.5% to about 7.5%, about 1.0% to about 10.0%, about 1.5% to about 10.0%, about 2.0% to about 10.0%, about 2.5% to about 10.0% nanographene by weight of the uncured resin, or any combination, sub-combination, range, or sub-range thereof. In some embodiments, the resin includes any suitable resin having a viscosity lower than 300 cps at a temperature below its glass transition temperature. For example, in one embodiment, the resin includes Hexcel® 1078, available from Hexcel corporation. Other suitable resins include, but are not limited to, Hexcel VRM 37, PTMW P2752, FibreGlast 4500, or any other resins that are below 300 cps at a temperature below its glass transition temperature, or a combination thereof.

The thin ply may be incorporated into or within the stitched composite at any suitable position. In some embodiments, for example, the thin ply is incorporated on a surface of the stitched composite. Additionally or alternatively, in some embodiments, the thin ply is incorporated between plies of the stitched composite, such as, but not limited to, between the second and third stitched composite plies from the surface, midplane with respect to the stitched composite plies, or at any other position relative to the stitched composite plies. Suitable thin ply materials include, but are not limited to, dry thin plies, carbon fiber thin plies, thin plies with any suitable modulus, thin plies with any suitable weave, or a combination thereof. In one embodiment, for example, the one or more thin plies include intermediate modulus biaxial plain weave carbon fiber thin plies (e.g., TeXtreme® 1009 from TeXtreme).

Together, the nanographene dispersed resin, and thin plies form a hybrid barrier layer material suitable for use in stitched polymer matrix composites. In some embodiments, the incorporation of the nanographene into the resin and/or thin ply reduces or eliminates crack formation in the polymer matrix composite. Without wishing to be bound by theory, it is believed that the energy required to propagate a transverse crack through the thickness of a thin ply is really high due to its small cured ply thickness. This results in a deflection of the transverse cracks into in-plane directions forming delaminations between a standard thickness ply and the thin ply barrier layer. Thus, the thin ply reduces or eliminates micro-crack networks due to large thermal stresses. The nanographene, on the other hand, increases the fracture toughness of the resin rich areas that are formed near stitching zones. While such resin rich areas are often brittle and develop micro-cracks due to a difference in the coefficient of thermal expansion of the stitching thread, carbon fibers, and the surrounding matrix, the increased fracture toughness provided by the nanographene in the resin reduces or eliminates micro-crack formation in these regions. Additionally, by reducing or eliminating micro-crack formation and/or growth, the incorporation of the nanographene dispersed resin and/or thin ply reduces or eliminates the gas permeability that results from such micro-cracks in stitched composites and structures utilizing such composites. Furthermore, while in-plane strengths can be achieved by proper fiber orientation, stitching provides the necessary through-thickness reinforcement to enhance interlaminar tensile and shear strengths.

Due to the reduction or elimination of micro-cracks and gas permeation, the hybrid composite material disclosed herein forms an improved material for use in the formation of various components and articles. Accordingly, also provided herein are articles formed from the hybrid layer material. In some embodiments, the hybrid layer material may be used to form a barrier layer for applications such as, but not limited to, cryogenic tanks and structures. For example, in some embodiments, the article includes a high-pressure composite cryogenic tank. Other articles include, but are not limited to, pressure habitats; bladder, piston, or diaphragm accumulators; or a combination thereof. As discussed above, the hybrid composite material disclosed herein reduces or eliminates the formation or growth of micro-crack networks and resulting gas permeability, as compared to existing articles. In some embodiments, the hybrid composite material and/or the article include a combination of barrier layers to further reduce or eliminate the micro-crack network and gas permeability.

Figure 3A:
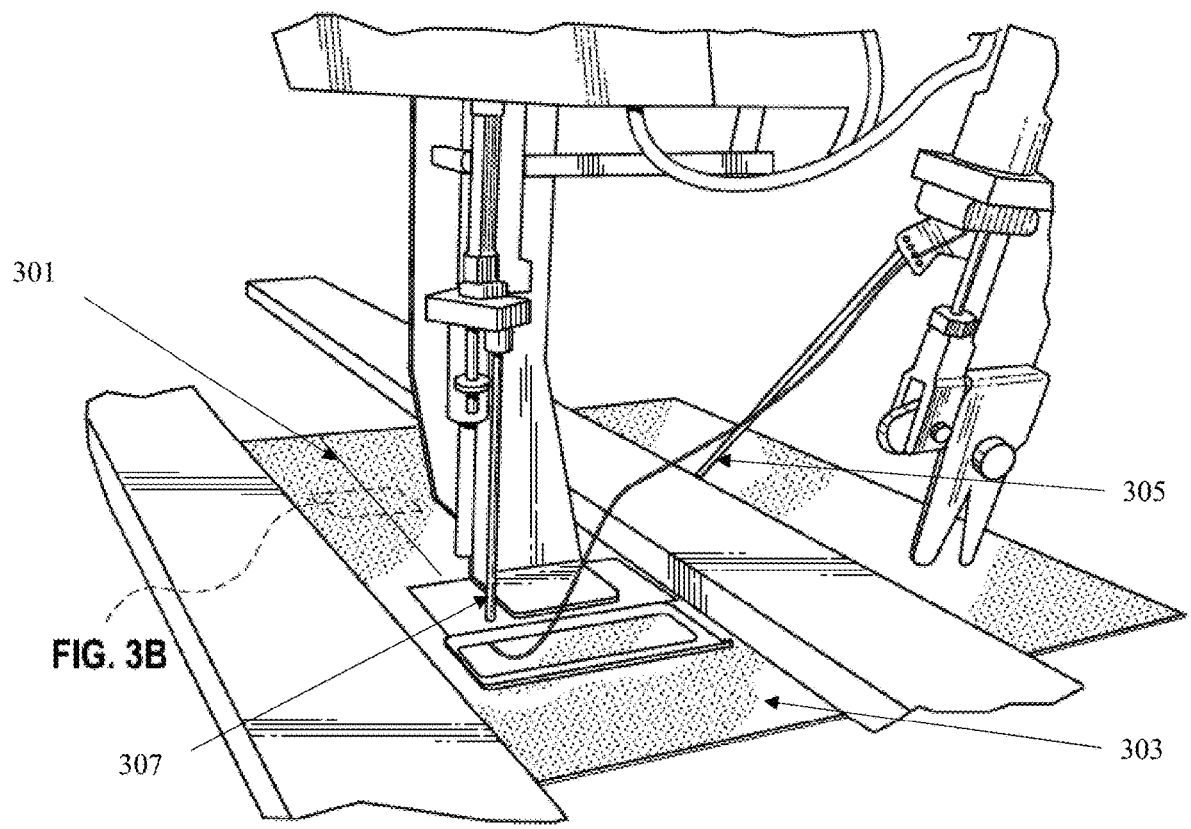
FIGS. 3A-B show the robotic end effector stitching a dry carbon preform. (A) Stitching Assembly. (B) Stitch.
Figure 3B:
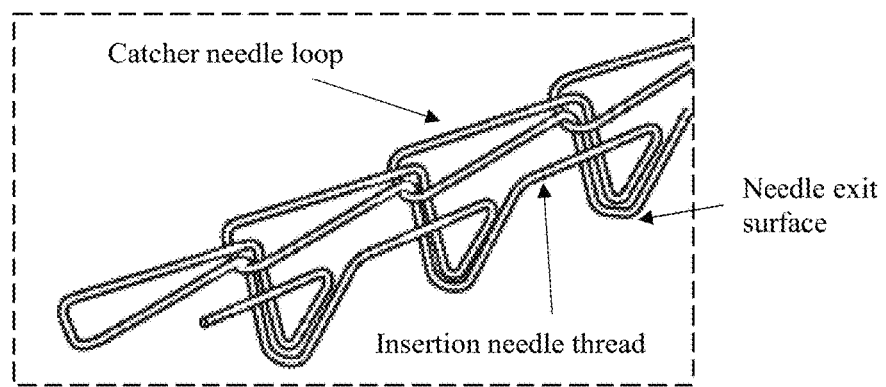

Further provided herein are methods of fabricating the hybrid composite material and articles including the same. In some embodiments, one or more thin plies are placed in the stitched preform, which is then infused with nanographene-dispersed resin. The stitched preform is formed by any suitable stitching method, such as, but not limited to, a modified chain stitch. Additionally, the stitching may be performed with any suitable system, such as, but not limited to, the stitching system illustrated in FIGS. 3A-B, which has a 45° needle to insert the thread and a 90° needle to catch the loop formed by the former. In some embodiments, for example, a single seam of a modified chain stitch is inserted into the dry carbon preforms at the center by a KSL one-sided stitching robotic head. The geometry of the modified chain stitch formed by one-sided stitching is shown in FIG. 3B. A 1200 D Vectran™ thread is used in the two-needle stitching end effector to stitch the preforms. The preforms may be stitched with any suitable pitch and spacing, such as, but not limited to, a pitch of 5 mm and a spacing of 14 mm. Following stitching, the resin is infused by any suitable method. In some embodiments, the resin is infused by a method that does not involve autoclave, such as, but not limited to, VARTM.

Figure 2A:
FIGS. 2A-B show (A) resin transfer into pressure chamber for degassing and (B) infusion of GNP modified Hexflow 1078 into stitched carbon preforms.
Figure 2A:
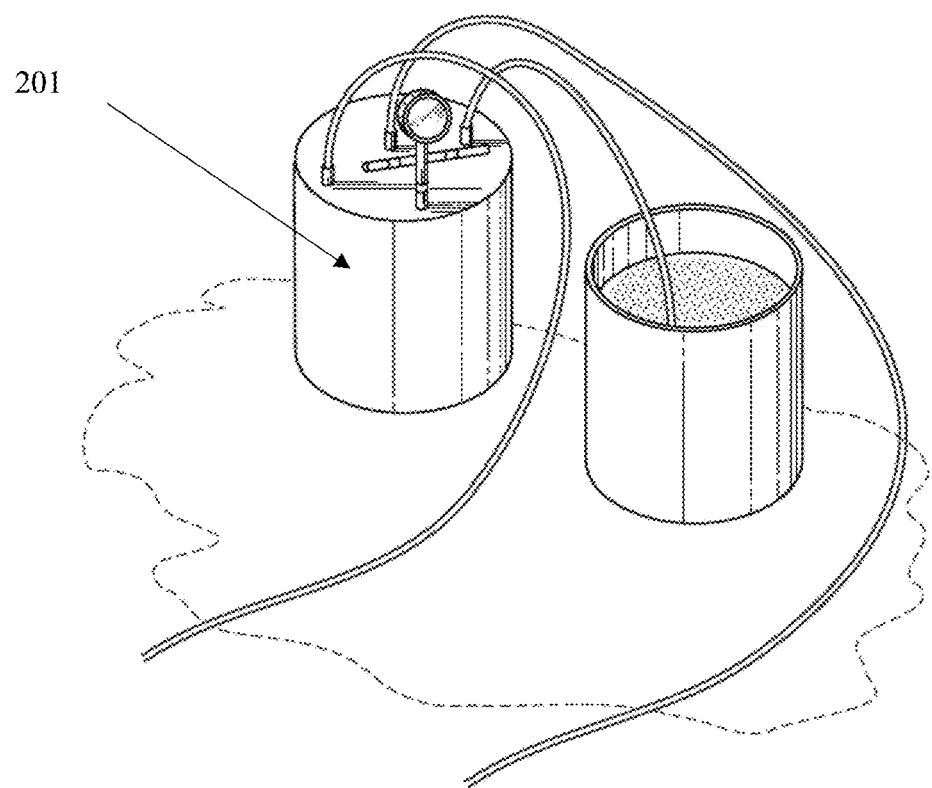
Figure 2B:
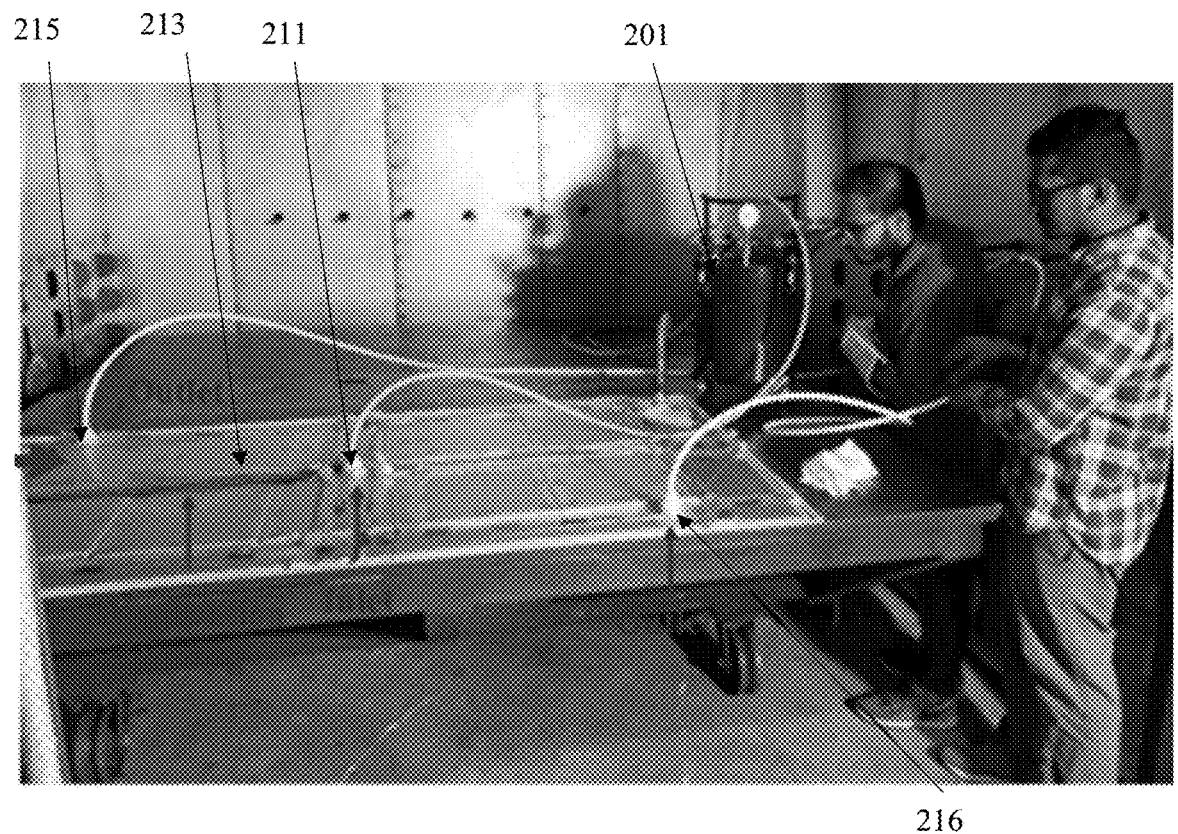
Figure 2B:
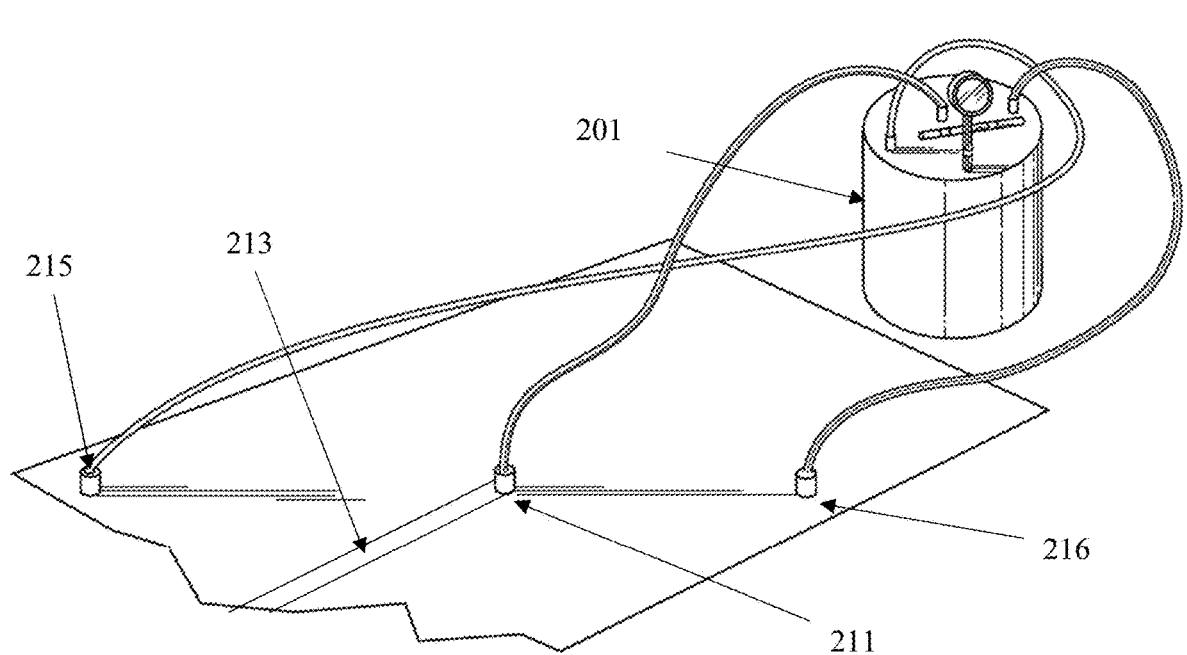

Further provided herein are methods for dispersing nanographene into the resin and infusing the modified resin into the carbon preforms with or without thin plies. In some embodiments, for example, nanographene platelets (9 nm particle size or any suitable size) are incorporated into, but not limited to, Hexflow 1078 (1% by weight) prior to infusion. To disperse a high percentage of nanographene into the epoxy, Parts A (resin) & B (hardener) of Hexcel 1078 are heated to 190° F. in separate containers. Heating the resin and hardener separately delays the onset of vitrification within the epoxy. Additionally, Part A has a low viscosity (~65 cps) at 190° F. This aids in the GNP dispersion as they tend to coagulate in contact with viscous media. Pre-measured GNPs and Part B were equally divided by volume into ten separate containers. Each container of GNP was dispersed into the Part A by stirring the mixture at 45 rpm with a mixing bit followed by pour of one container of Part B at 190° F. This ensures an even distribution of GNP within the epoxy. FIG. 1 shows the completed mixture of Hexflow 1078 and GNP at 190° F. before infusion. The completed mixture is then transferred into a pressure chamber where it is degassed under vacuum for 20 minutes. The transfer process of the mixed resin into the chamber for degassing followed by the infusion are shown in FIGS. 2A-B.

In contrast to existing methods, where thin ply prepregs, which are not a viable option for dry stitched composites, are used in fabrications for gas permeation, the methods disclosed herein utilize materials and processes involving dry thin plies in stitched laminates. Since all materials in the presently disclosed stitched assembly are dry, no out-time or autoclave requirements exist. Additionally, the methods disclosed herein incorporate dry thin plies and nanographene dispersed resin, which, as discussed above, mitigate and/or stop the propagation of micro-crack networks and resulting permeability. Furthermore, as opposed to existing articles that are formed with bonded or mechanically-fastened joints, which are a common point of failure, the methods disclosed herein permit formation of a unitized structure without bonded or mechanically-fastened joints.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1

In this study, gas permeation of three-dimensional stitched polymer matrix composites (PMCs) with thin plies (cured thickness ≈0.032 mm) and nanographene dispersed resin as barrier layers is investigated. Stitched carbon/epoxy composites ($[+45/-45]_{4s}$) with standard thickness plies and unmodified resin were used as baseline laminates. Thin plies were added to both baseline designs to fabricate three different laminates with one thin ply (1) placed on both laminate surfaces, (2) embedded two plies from each laminate surface, and (3) at the laminate midplane. Test coupons were thermo-mechanically cycled from ambient temperature to cryogenic temperature (−196° C.) and from 0 to 4500 microstrain. Gas permeability of these composites was measured after specific numbers of thermo-mechanical cycles under various levels of mechanical strain. Specimens without any barrier layers showed a sharp increase in permeability after the first cryogenic cycle, whereas this behavior was absent in specimens with thin plies and/or nanographene as barrier layers. Specimens with thin plies placed at the surface showed minimal change in permeability with increasing thermo-mechanical cycles followed by specimens with hybrid barrier layers as compared to the baseline specimens. Microcrack density was found to be increasing with cryogenic cycles. In some cases, midspan crack densities were found to be more than edge crack densities. For stitched specimens cracks developed in the resin rich areas around the stitching seams whose formation was resisted by nanographene dispersion in the resin. Thin plies were effective in resisting microcrack growth and acted as integral liners to prevent excessive gas flow through the stitched specimens. Overall, hybrid barrier layers were successful in reducing the gas permeability of stitched composites.

INTRODUCTION

Cryogenic propellant tanks are critical components of space launch systems and future hypersonic/supersonic air vehicles. In recent years, NASA has made significant efforts in the development of reusable cryogenic propellant tanks [1,2]. For more than five decades, various space launch vehicles have relied on metallic cryogenic propellant tanks, which constitute 50% to 70% of the dry weight of the vehicle [3]. To be economically feasible, one of the main requirements for reusable launch vehicles is structural weight reduction [4,5], which can be accomplished by using lightweight composite materials. Fiber-reinforced polymer matrix composites (PMCs) have a high specific strength, specific stiffness, and a relatively low coefficient of thermal expansion (CTE) in the fiber direction. These features are advantageous in the design of lightweight cryogenic fuel tanks. However, PMCs are prone to transverse microcracking due to thermal fatigue that involves thermal cycling to cryogenic temperatures [6-11]. The necessity for reusability requires the cryogenic propellant tanks to be filled and drained several times. Such refueling operations exert extreme thermal stresses on the composite structures due to the mismatch in coefficients of thermal expansion between the reinforcing fibers and the surrounding matrix. These stresses, in combination with external mechanical loads, initiate a network of microcracks and delaminations that increase fuel leakage through the wall of the composite tank leading to a hazardous situation for the vehicle. The severity of this issue increases for upper stages of the space launch vehicle with longer mission times. Therefore, composite cryogenic tanks must be designed to resist the formation of thermal fatigue induced microcracks, subsequently reducing gas permeation through the walls of the composite structure.

Gas permeability of composites has been studied by several researchers both analytically and experimentally. Studies to measure permeability in unstitched [10, 12-21] and stitched [22] composites, investigate transverse microcracking [6, 20, 21, 23-25], and predict gas flow through composites [17, 26-29] have been performed. Bechel, et al. studied the correlation between thermal fatigue-induced microcracks and helium permeability of carbon fiber PMCs [13]. The maximum temperature of the thermal cycle was found to influence the growth of transverse microcracks in PMCs. The choice of layup was also found to influence the gas permeability of composites. A cross-ply layup ($[0/90]_{2s}$) had lower permeability compared to a quasi-isotropic layup ($[0/45/-45/90]_s$). Similar results were reported by Bechel, et al. in a different study where the effect of stacking sequence on the formation of thermal fatigue-generated microcracks was investigated [23]. A stacking sequence where plies were 90° out of phase with adjacent plies had better microcrack resistance than plies that were 45° out of phase with adjacent plies. Choi, et al. studied the effect of cryogenic cycling on gas permeability of graphite/epoxy composites [16]. In laminated composites, permeability was found to increase with number of cryogenic cycles as microcracks in various plies connect to form pathways leading to gas leakage. Kumazawa, et al. [19] studied the gas permeability of PMCs analytically and experimentally under biaxial strain and thermal loads. Gas leakage was found to increase with increasing crack density and thermo-mechanical loads. Analytical models by Peddiraju, et al. [26] showed that increased crack density in any one ply influenced the effective conductance of the laminate. Roy and Benjamin [27] developed a mathematical model to predict the permeability of an orthotropic laminate for a given delamination length, crack density and loading conditions using Darcy's law for isothermal, viscous flow of gases through porous media. An expression was derived to predict the delaminated crack opening displacement (DCOC) based on the first-order shear laminate theory and the obtained DCOD values were used as inputs to the permeability model. Nair and Roy [28] extended the model to predict DCOD values for each ply of a damaged laminate and used the results to predict their gas permeability.

There have been several efforts focused on finding a solution to reduce gas permeation in cryogenically cycled composites. For more than two decades metallic liners have been the choice of industry to reduce gas permeation in PMCs. However, a mismatch in the CTE of the metal and the polymer matrix results in the debonding of the liner from the tank, leading to excessive permeation [30]. Metal liners also add to the overall weight and can be difficult to fabricate and maintain. Polymer liners such as thermoplastic liners have shown promise in resisting microcracking at cryogenic temperatures [31, 32]. To achieve a liner-less pressure vessel, woven textile material [33], thermoplastic matrix such as polyetheretherketone (PEEK) [34], and prepreg "thin plies" (cured ply thickness <0.06 mm) have been used in PMCs undergoing thermal fatigue [3, 17, 18, 29, 35]. Thin plies have shown improved damage tolerance and resistance to matrix-cracking due to their higher in-situ transverse strength. The reduction in ply thickness delays the onset of delaminations and microscopic cracks before ultimate failure. Wang et al. [36, 37] studied the fracture growth in composite laminates using energy release rate theory and determined that the onset stresses for transverse cracking are inversely proportional to the square root of the thickness of the plies. However, prepreg thin plies are not suitable for applications in stitched composites which are mostly fabricated through a resin infusion process. Dry thin plies have seldom been used within a composite preform to fabricate laminates using resin infusion, and no studies with thin plies in a stitched composite laminate have been found in the open literature.

Although lightweight composite cryogenic tanks have been manufactured using pre-impregnated (prepreg) material systems [3, 38], some issues with these tanks exist. Fabrication of these tanks requires a multi-step process that involves several cures and adhesive bonding of different parts, which are prone to large out-of-plane peel stresses [39, 40]. Also, a difference in CTE between the adhesive and the composite substrates can cause additional stresses at very low temperatures. Non-destructive evaluation must be conducted at each step of the fabrication process to ensure a damage-free part. Considerations need to be made with respect to prepreg shelf life and access to large autoclaves for part cure. Such a multi-step process adds both cost and time requirements to the project.

Through-thickness stitching of dry composite preforms, followed by resin infusion using vacuum assisted resin transfer molding (VARTM), enables the fabrication of unitized structures with seamless co-cured interfaces and removes many issues involved with fabrication of prepreg composite tanks. The dry preform eliminates concerns with material shelf-life; most VARTM resins are cured at room temperature or elevated temperature in an oven, removing the need for expensive autoclave cures. Moreover, transverse stitching increases the interlaminar tensile and shear strengths of composites, thereby enhancing their out-of-plane mechanical properties. Such features facilitate the design of lightweight cryogenic propellant tanks. In our previous study Saha, et al. [22] researched the influence of through-thickness stitching on gas permeability of cryogenically cycled composite specimens. Stitching caused an increase in the helium permeability of composites. Intermediate modulus carbon fiber specimens had better permeability performance than standard modulus carbon fiber specimens and ply-by-ply microcrack densities increased with number of cryogenic cycles. In addition to transverse cracks, stitched specimens developed microcracks in the resin rich areas around stitching seams, further increasing gas permeation. A solution to limit the gas permeability of stitched composites with increasing cryogenic cycles is presented.

In this study, dry thin plies (cured ply thickness ≈0.032 mm) and nanographene dispersed resin were incorporated in PMC laminates to limit the development of transverse crack networks and reduce gas permeability of stitched carbon/epoxy composites. Baseline laminates consisted of stitched carbon/epoxy composites with standard thickness plies. Thin plies were added to baseline designs to fabricate three different composites with one thin ply (1) placed on both laminate surfaces, (2) embedded two plies from each laminate surface, and (3) at the laminate midplane. Test coupons were thermo-mechanically cycled from ambient temperature to cryogenic temperature (−196° C.). Gas permeability of these composites was measured at selected numbers of cryogenic cycles. Ply-by-ply microcrack densities with increasing cryogenic cycles at the laminate edges and the mid-span were measured using optical microscopy.

Experimental Method

Composite Fabrication

The fabrication matrix is shown in Table I. Stitched carbon/epoxy specimens ($[+45/-45]_{4s}$) with barrier layers were fabricated from bi-axial (+45/−45) intermediate modulus non-crimp fabric (NCF) from VECTORPLY®. Carbon fiber tows (Toho Tenax IMS 65 of tensile modulus ≈290 GPa) were held together in the NCF by non-structural tricot stitches.

An intermediate modulus bi-axial plain weave carbon fiber thin ply (TeXtreme 1009), with an aerial weight of 36 gsm per ply was incorporated in the NCF preform at three different locations for specimen types 2, 3, 4, and 6. As shown in Table I, thin plies indicated by "T" in the layup configurations were incorporated at two plies from the surface, in the midplane, or on the surface. An out-of-autoclave epoxy system, Hexcel 1078 from Hexcel Corporation, was infused into the dry carbon preforms using vacuum assisted resin transfer molding (VARTM) without any modifications for specimen types 1-4. For specimen types 5 and 6, nanographene platelets (9 nm particle size) from Sigma Aldrich were incorporated into Hexflow 1078 (1% by weight) prior to infusion, thus forming a hybrid barrier layer in specimen type 6. To disperse a high percentage of GNP into the epoxy, Parts A (resin) & B (hardener) of Hexcel 1078 were heated to 190° F. in separate containers. Heating the resin and hardener separately delays the onset of vitrification within the epoxy. Additionally, Part A has a low viscosity (~65 cps) at 190° F. This aids in the GNP dispersion as they tend to coagulate in contact with viscous media. Pre-measured GNPs and Part B were equally divided by volume into ten separate containers. Each container of GNP was dispersed into the Part A by stirring the mixture at 45 rpm with a mixing bit followed by pour of one container of Part B at 190° F. This ensures an even distribution of GNP within the epoxy. FIG. 1 shows the completed mixture 101 of Hexflow 1078 and GNP at 190° F. before infusion. The completed mixture is then transferred into a pressure chamber 201 where it is degassed under vacuum for 20 minutes. The transfer process of the mixed resin into the chamber for degassing followed by the infusion are shown in FIGS. 2A-B. As illustrated in FIG. 2B, the infusion system includes an inlet 211, a distribution spring 213, and two outlets 215,216.

A single seam 301 of a modified chain stitch was inserted into the dry carbon preforms 303 at the center by a KSL one-sided stitching robotic head. A 1200 D Vectran™ thread was used in the two-needle stitching end effector to stitch the preforms with a pitch of 5-mm. The stitching system, shown in FIGS. 3A-B, has an insertion needle 305 oriented at 45° and a catcher needle 307 at 90° to catch the loop formed by the former. For specimens 2, 3, and 6, the two-needle system stitched through the thin plies because of their placement within the NCF preforms. Thin plies were placed on both surfaces of specimen 4 after they were stitched, thus avoiding stitching through the thin plies.

Figure 4:
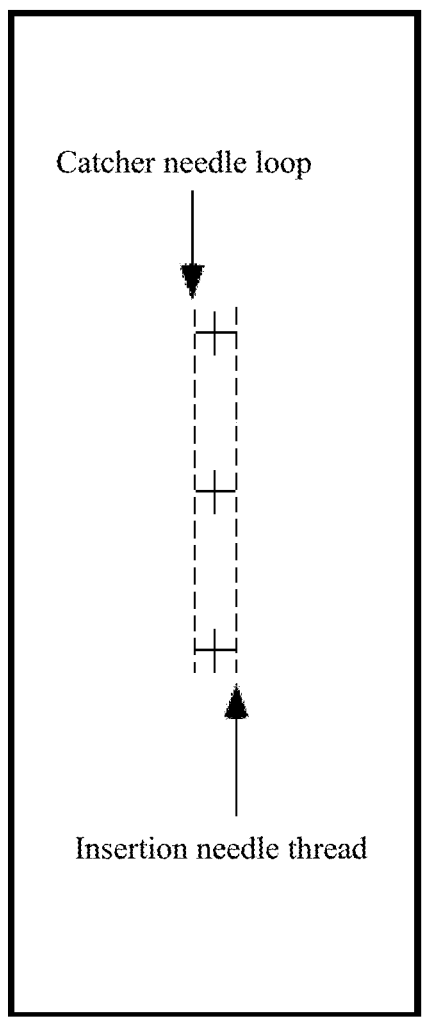
FIG. 4 shows the test specimen schematic with strain gage locations.

FIG. 4 shows the specimen dimensions with '+' indicating the location of the strain gauges mounted to the surface of the composite test articles. Composite specimens (12 in.×4 in.) were carefully machined from the cured laminates using a diamond blade tile saw at a low speed. Each stitched specimen was polished on all four edges prior to thermo-mechanical cycling and no edge microcracks were observed using an optical microscope. After twenty thermal cycles, the specimens were sectioned and polished along the diagonal edges for mid-span microcrack measurements using optical microscopy.

TABLE 1

Description of Composite Specimens

| Specimen Type | Name | Layup | Thickness (mm) | Barrier Layer | Location of Barrier Layer |
|---|---|---|---|---|---|
| 1 | Control_S | $[+45/-45]_{4s}$ | 3.1 | | |
| 2 | Ply2_S | $[+45/-45/\mathbf{T}/+45/-45/+45/-45/+45/-45]_S$ | 3.21 | Thin Ply | 2 plies from surface |
| 3 | Midplane_S | $[+45/-45/+45/-45/+45/-45/+45/-45/$ $\mathbf{T}/-45/+45/-45/+45/-45/+45/-45/+45/]$ | 3.17 | Thin Ply | Midplane |
| 4 | Surface_U | $[\mathbf{T}/+45/-45/+45/-45/+45/-45/+45/-45/]_S$ | 3.2 | Thin Ply | Surface |
| 5 | NG_S | $[+45/-45]_{4s}$ | 3.14 | GNP | In the matrix |
| 6 | NG_Ply2_S | $[+45/-45/\underline{\mathbf{T}}/+45/-45/+45/-45/+45/-45]_S$ | 3.21 | GNP + Thin Ply | GNP: In the matrix; Thin Ply: 2 plies from the surface |

Uniaxial Thermo-Mechanical Cycling

Figure 5:
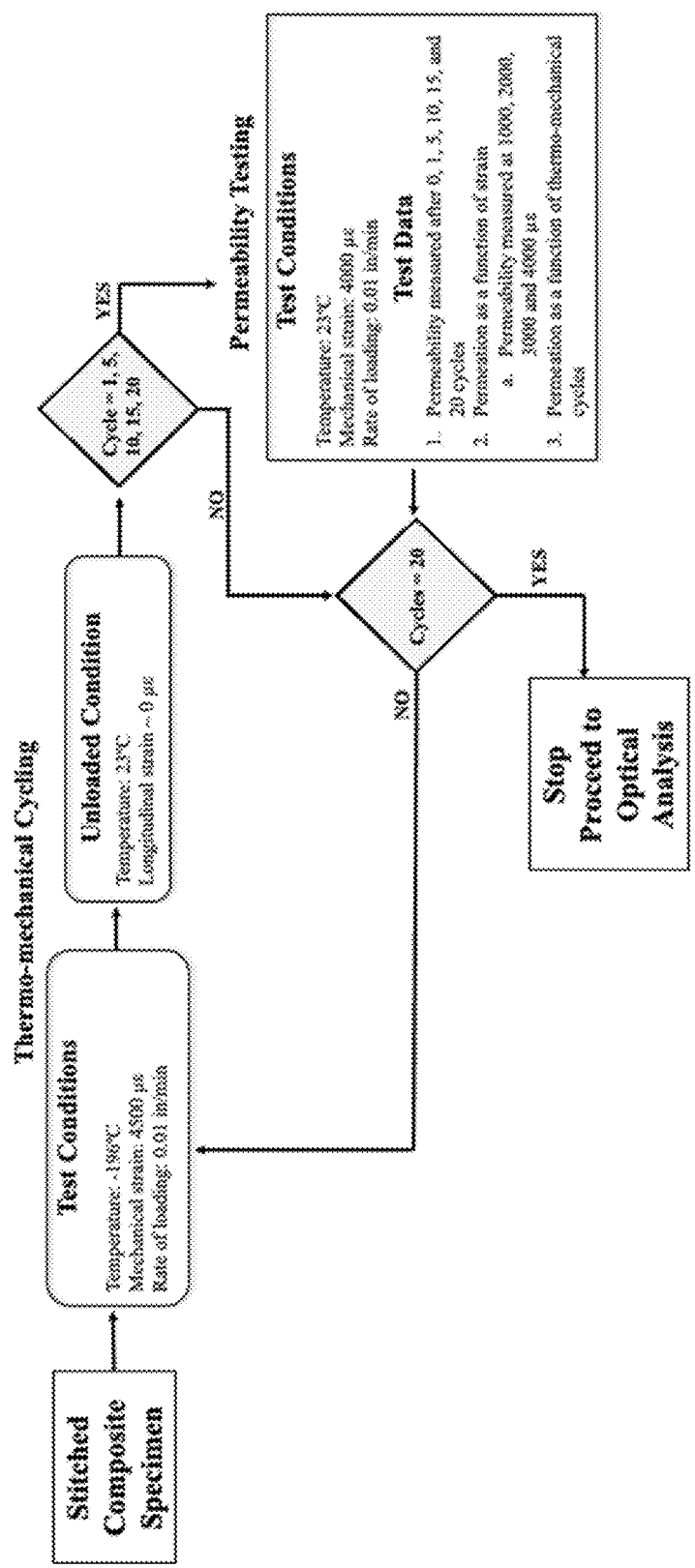
FIG. 5 shows the uniaxial thermo-mechanical cycling algorithm.
Figure 6:
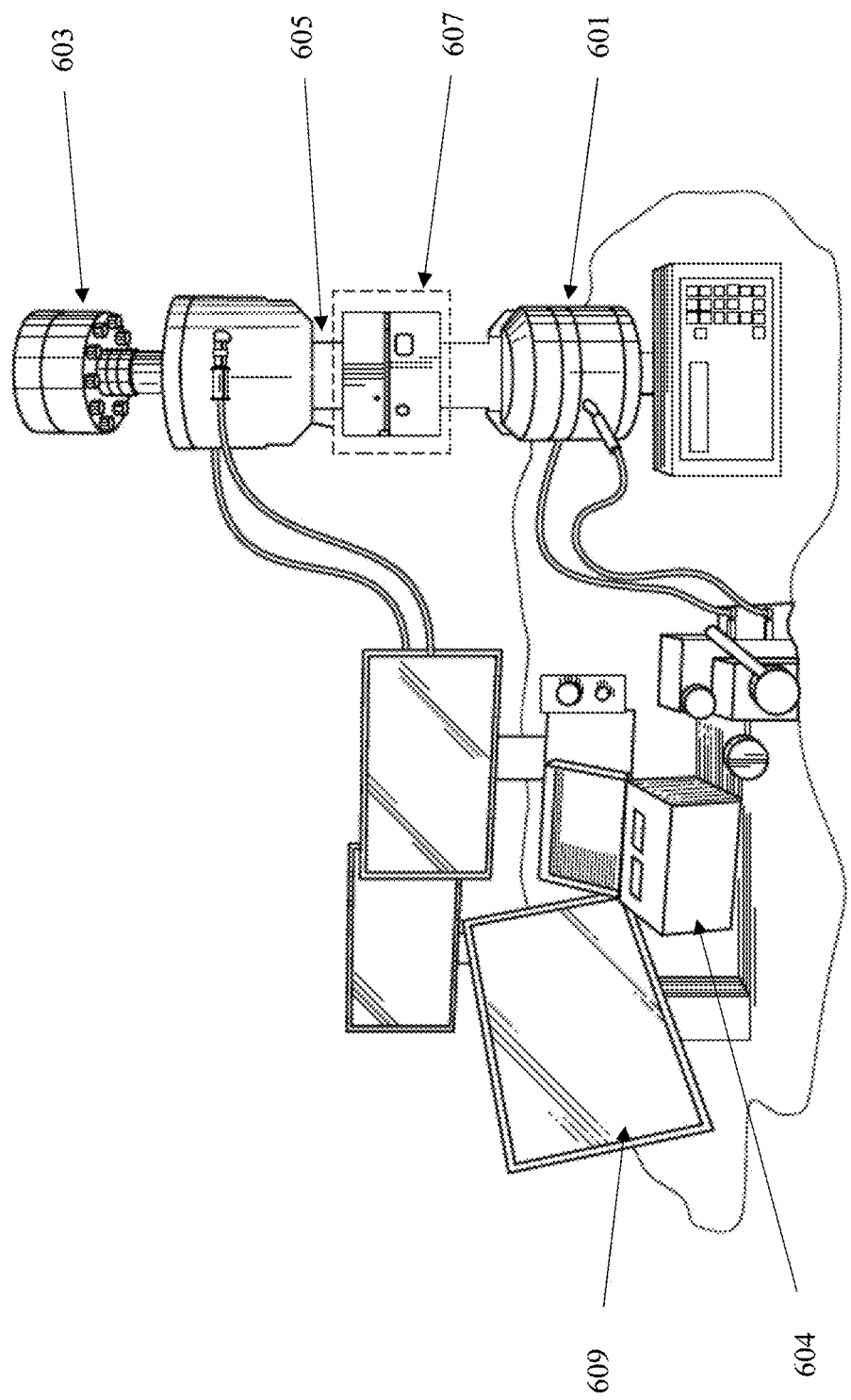
FIG. 6 shows the uniaxial thermo-mechanical test setup.

The specimens were subjected to twenty thermo-mechanical cycles following an algorithm shown in FIG. 5. A servo hydraulic Instron test frame 601 with a 25 kips load cell 603 and strain acquisition system 604 was used to apply uniaxial mechanical loads to the specimens 605. A preload of 500 lbs. was initially applied to each specimen, while liquid nitrogen (LN$_2$) was introduced into the permeability test section sealed by a foam enclosure 607, as seen in FIG. 6. LN$_2$ level and ambient temperature inside the cryogen enclosure was continuously monitored using an optical fiber system 609. Once the test section reached a steady state temperature (~−196° C.), the specimens were uniaxially loaded at 0.01 in/min till a strain level of 4500με was reached in any one of the strain gauges. The peak load level was held for one minute, followed by an unloading to 500 lbs. at 0.01 in/min. LN$_2$ was flushed out from the permeability gauge section and the specimen was allowed to reach ambient temperature. The entire cycle was repeated 20 times with gas permeability being measured at select cycles at room temperature for all specimens.

Three CF series strain gauges from Tokyo Measuring Instruments Lab were used to measure surface strains. Strain responses, $\varepsilon_{Corrected}$, were corrected for thermal output and gage factor variance with temperature by:

$$\varepsilon_{Corrected} = \frac{K}{K_T}\varepsilon_{Apparent} \tag{1}$$

$$\varepsilon_{apparent} = -29.4 + 2.32T - 0.046T^2 + 0.000167T^3 \tag{2}$$

where, K is the gage factor at room temperature, $K_T$ is the gage factor at T ° C., and $\varepsilon_{Apparent}$ is the apparent strain indicated by the strain indicator.

Damage Measurement

Each stitched test specimen was polished on all four edges before cryogenic cycling. The edges were roughly grounded with 600, 800, and 1500 grit sandpapers, followed by fine grinding with 2000, 3000, and 4000 grit sandpaper under wet conditions. Finally, the stitched specimens were polished using a paste of 3 micro-meter alumina particles dispersed in distilled water in a rotating polisher. Ply-level transverse microcracks were observed at 225× magnification using a stereo optical microscope. Transverse microcrack density was measured after 20 thermo-mechanical cycles. A crack was included in the measurement if it extended at least three-quarters of the ply thickness. Interior transverse microcrack densities were measured after 20 cryogenic cycles. Specimens were sectioned and polished along the diagonal edges following the same method as used for the edges.

Gas Permeability Testing—Uniaxial

Figure 7:
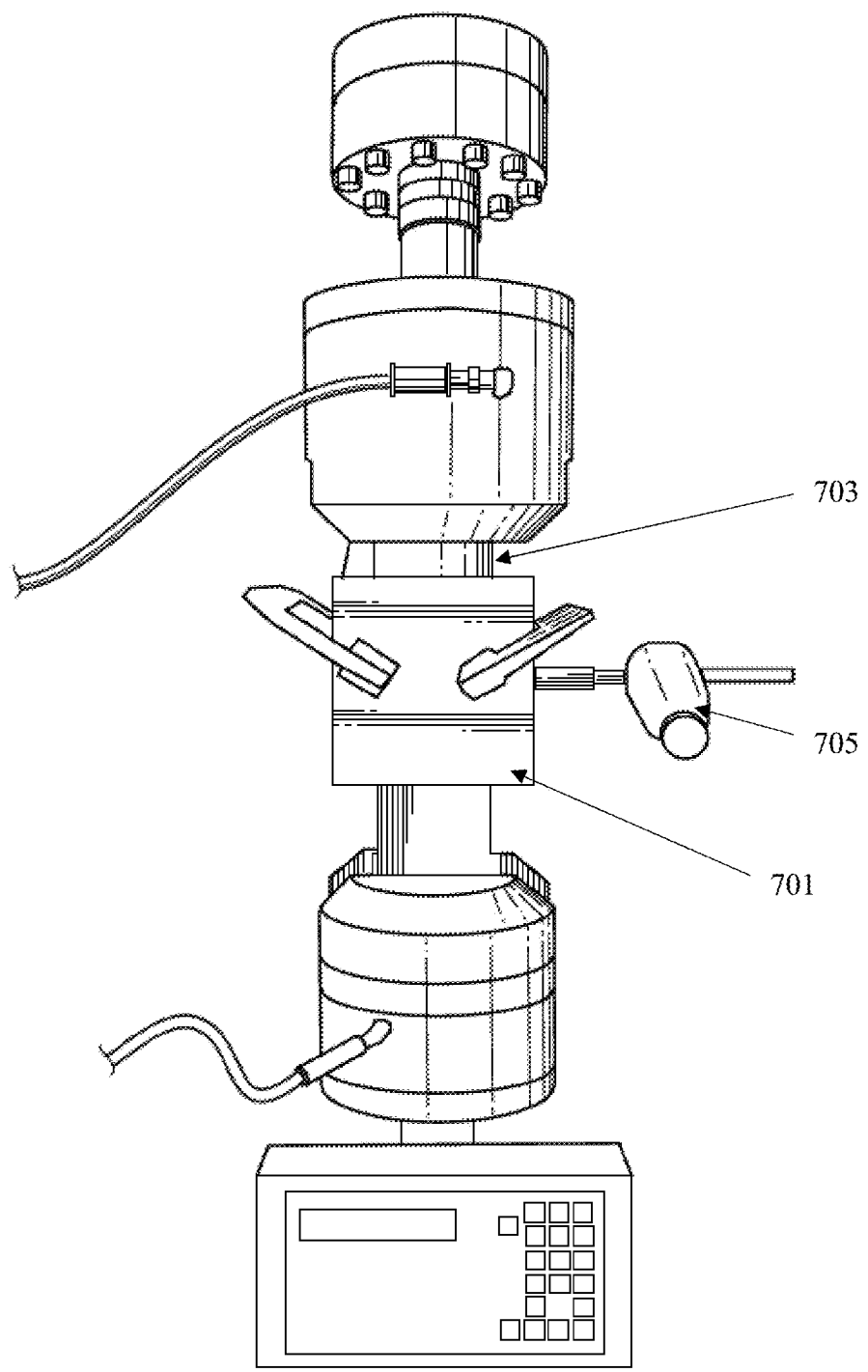
FIG. 7 shows the permeability testing of Surface_S under uniaxial load after fiver thermo-mechanical cycles.

Gas permeability of thermo-mechanically cycled composite specimens was measured at room temperature under uniaxial loads after select thermo-mechanical cycles, as shown in FIG. 5. Specimens were loaded at 0.01 in/min till the desired strain levels were achieved within the composite specimen. Permeability tests were performed at 1000, 2000, 3000, and 4000με for all specimens. FIG. 7 shows the permeability test setup for Surface S after 5 cryogenic cycles.

The permeability apparatus works on the principle of the volumetric flow of purge gas through the specimen thickness when a pressure differential is created across it. The test system 701 consists of two chambers between which the specimen 703 is centered and sealed by a neoprene gasket and an O-ring. A compressive load was applied to the assembly to avoid any gas leakage into the atmosphere. A positive test gas (helium) pressure of 20 psi was applied to the upstream chamber while flushing out any residual air in the apparatus by keeping all outlet valves open. A high-resolution pressure transducer 705 connected to a LabVIEW program continuously measured the inlet pressure. Following a complete purge of residual air, the outlet valves were closed, and the test gas was allowed to permeate through the specimen. As the gas permeated through the thickness of the specimen, it was collected in the downstream chamber and subsequently flowed into a glass capillary tube filled with a liquid slug (methanol). Once steady-state was attained for the displacement-rate of the liquid slug, the distance of the rise of the methanol was measured as a function of time using a high-speed camera mounted directly above the capillary tube. The atmospheric pressure and temperature near the capillary tube were continuously measured using a barometric pressure sensor and a thermometer, respectively.

A volumetric methodology is used to calculate gas permeability of the composite specimens. The rate of rise of the liquid slug is used to calculate the volume flow rate, $V_r$, as $$V_r = \text{slope} \times a_c \tag{3}$$

where slope is the rate of rise of the liquid slug in the capillary tube and $a_c$ is the cross-sectional area of the capillary tube. Using ideal gas law the permeability $\overline{P}$ is calculated from the volume flow rate, as $$\overline{P} = \frac{V_r p_0 t}{ART(p - p_0)} \tag{4}$$

where $P_0$ is the ambient pressure, t is the specimen thickness, A is the transmitting area of the specimen, R is the universal gas constant [8.3143 m$^3$Pa/(mol-K)], T is the ambient temperature in Kelvin, and p is the upstream pressure.

Results: Uniaxial Thermo-Mechanical Specimens with Thin Ply as Barrier Layer

Load, Displacement and Temperature Profile—Barrier Layer: Thin Ply

Figure 8:
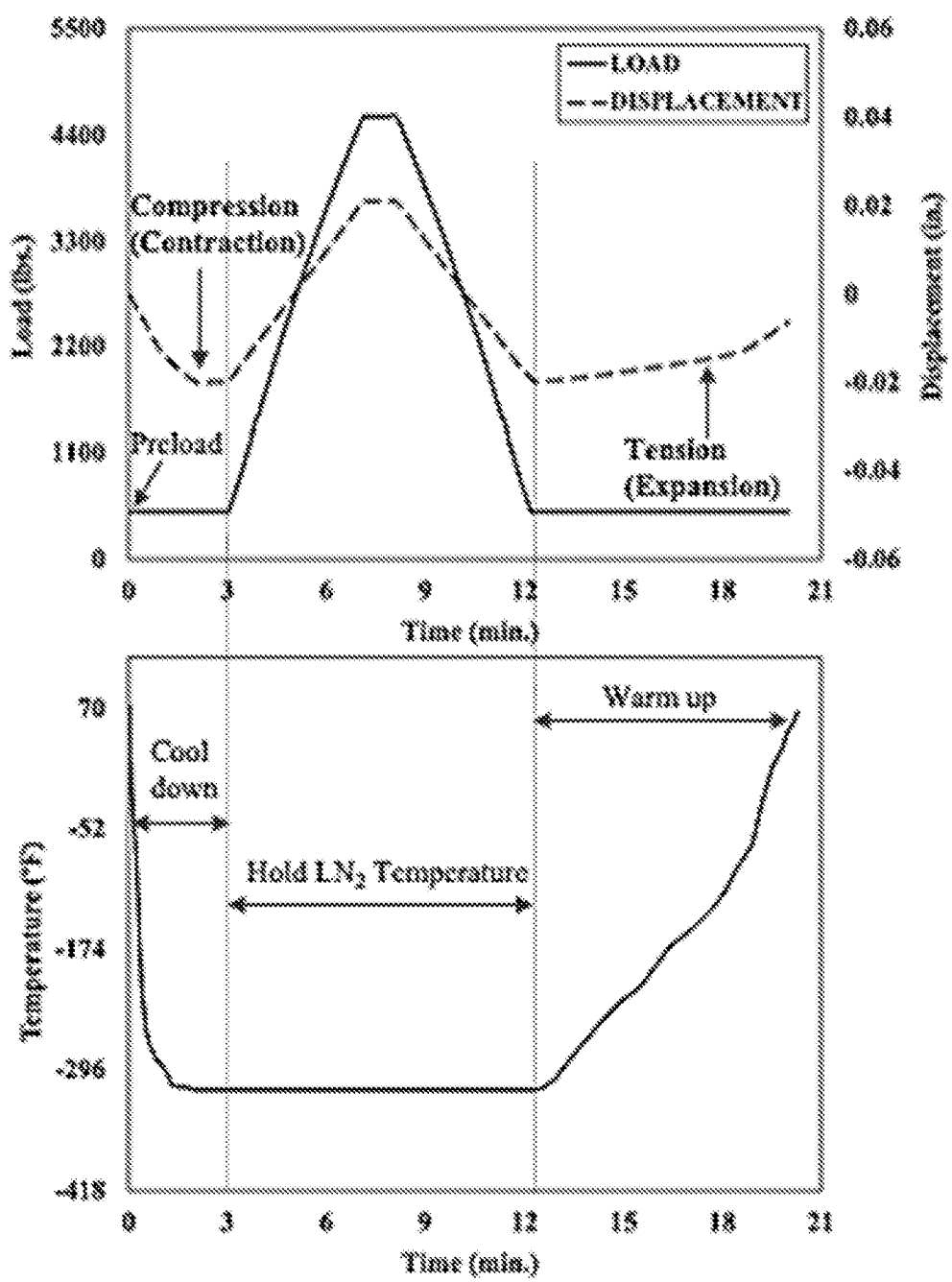
FIG. 8 shows graphs illustrating the load, displacement, and temperature data from Cycle 1 for specimens with thin plies.

The average load, displacement, and temperature data for a thermo-mechanical cycle for specimen types 2-4 are shown in FIG. 8. The indicated displacement was measured at the base of the hydraulic piston and included deformation in the entire load train. During the first 3 minutes of a thermo-mechanical cycle, the load level was held constant at 500 lbs. while the ambient temperature of the specimen decreased to −196° C. The displacement decreased to −0.0198 in. due to thermally induced contractions in the test specimen. Approximately six minutes into the cycle, the load was increased to a peak value of ~4604 lbs. and a peak displacement of 0.0212 in. The peak load was held for one minute, reduced to 500 lbs. and held until the specimen returned to room temperature.

Figure 9:
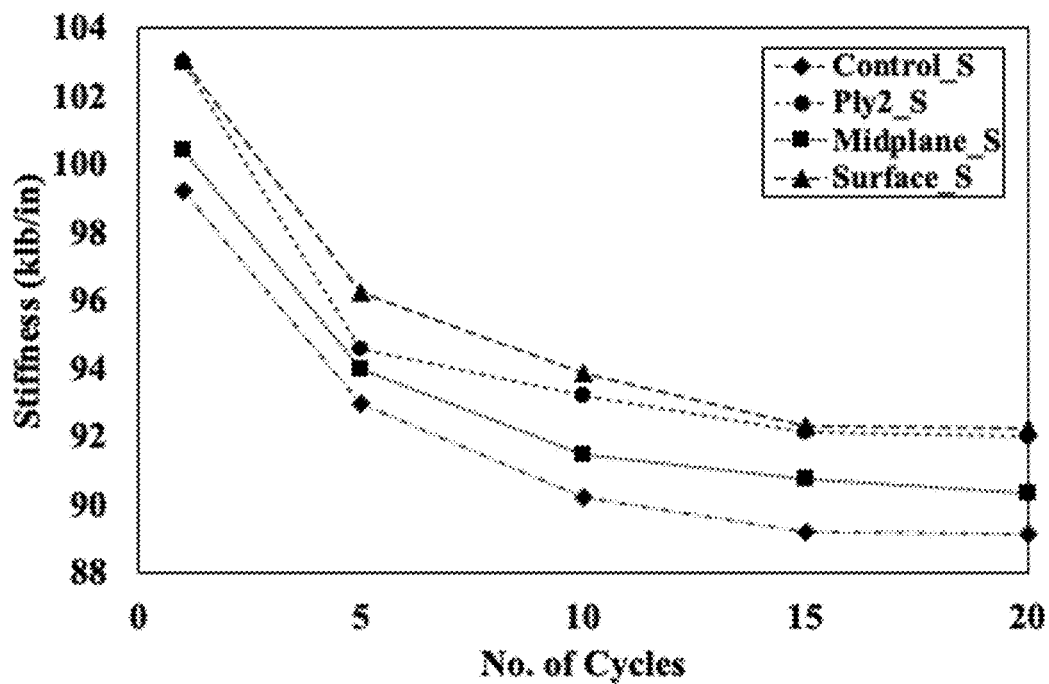
FIG. 9 shows a graph illustrating the stiffness of stitched composite specimens with thin plies as barrier layers with increasing thermo-mechanical cycles.

Specimen stiffness as a function of thermo-mechanical cycles is shown in FIG. 9. Ply2_S and Surface_S had the highest stiffness, followed by Midplane_S and Control_S. This is due to an additional thin ply present in the layup of Ply2_S and Surface_S. A reduction in stiffness with increasing cycles is observed for all specimens with Control_S undergoing the greatest reduction. Maximum reduction in stiffness for all specimens is observed within the first five thermo-mechanical cycles. The plot indicates a stability in stiffness after 15 thermo-mechanical cycles for all specimens.

Gas permeability Performance of Specimens with Thin Plies

Figure 10:
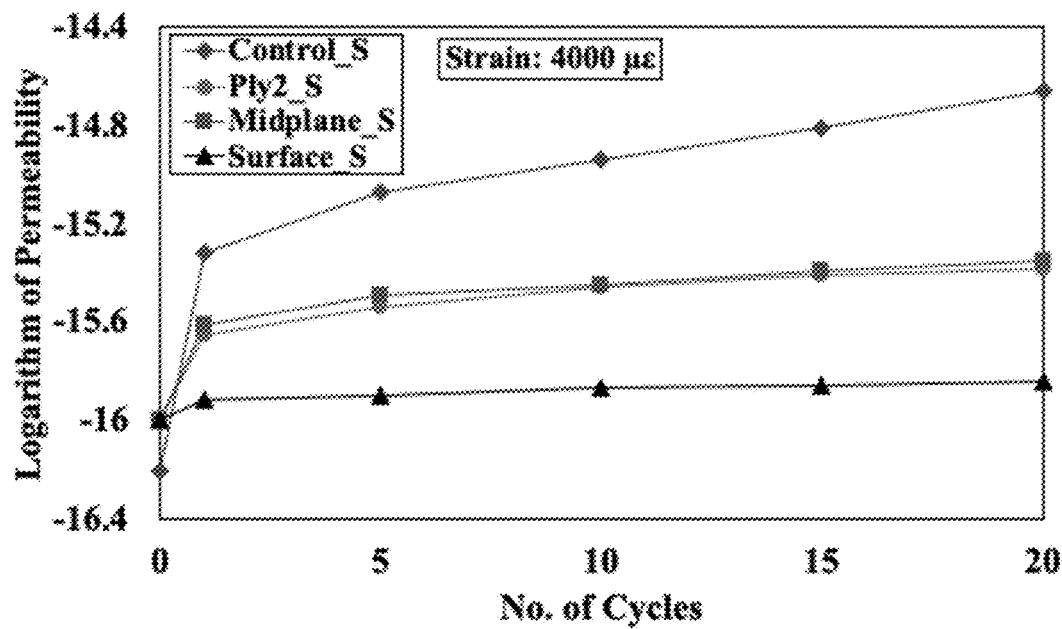
FIG. 10 shows a graph illustrating the logarithm of permeability as a function of thermo-mechanical cycles at 4000με.

Gas permeability of specimen types 1-4 as a function of thermo-mechanical cycles at a strain level of 4000με increases, as shown in FIG. 10. Control_S had the highest permeability and the highest rise in permeability after 20 cycles when compared to specimens with thin plies as barrier layers. The control specimen shows a sharp increase in permeability after the first cryogenic cycle, whereas this behavior is absent in specimens with thin plies as barrier layers. Specimens with a thin ply on both laminate surfaces have minimal change in permeability. Specimens with embedded thin plies have increased permeation when compared to specimens with thin plies on the surface, but they are less permeable than the control specimen. Specimens with embedded thin plies are effective in reducing the gas permeability after 5 cycles. A minimal change in permeability is observed for specimens with thin ply on the surface, which indicates its effectiveness in reducing helium permeation through stitched PMC specimens under uniaxial loads.

Figure 11A:
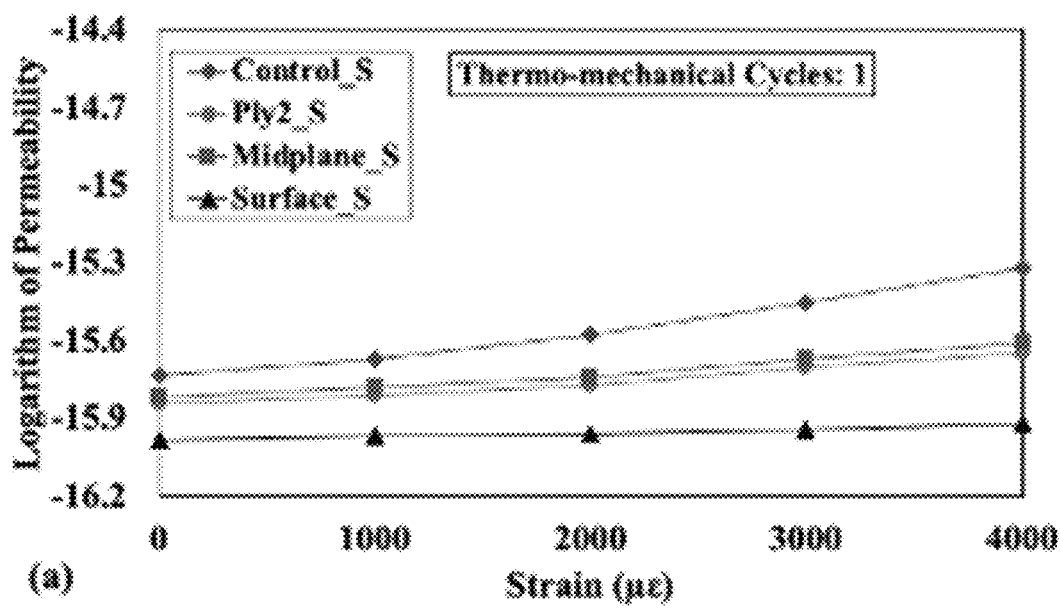
FIGS. 11A-B show graphs illustrating the logarithm of permeability as a function of strain at (A) 1 cycle and (B) 20 cycle.
Figure 11B:
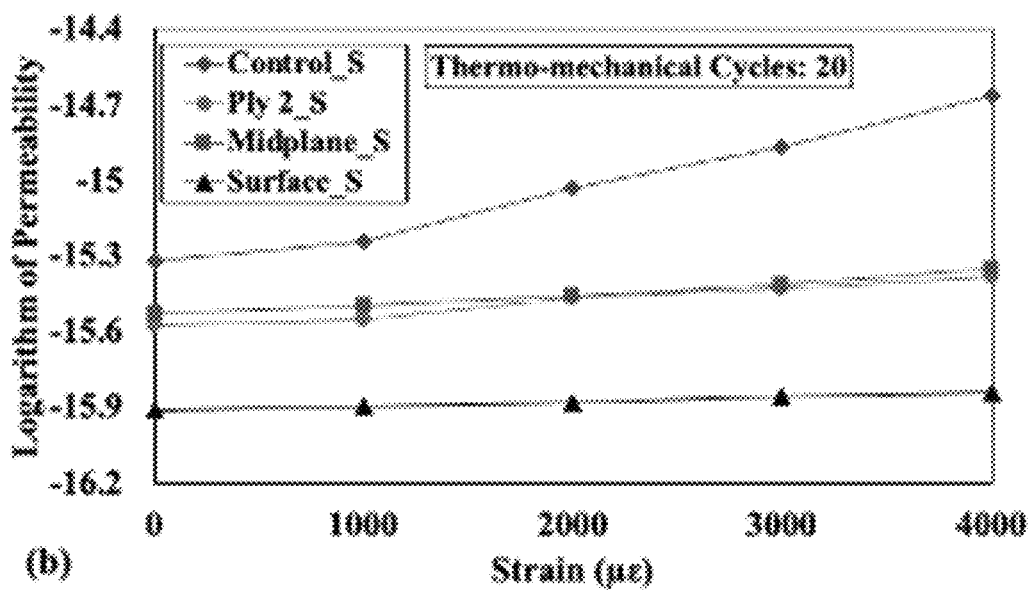

Gas permeability as a function of strain for thin ply specimens is shown after thermo-mechanical cycle 1 and cycle 20 in FIGS. 11A and B, respectively. Permeability is observed to increase with increasing mechanical strain and generally follows a linear relationship. Control_S had the highest rise in permeability with increasing strain when compared to specimens with thin plies. Minimal change in permeability for specimens with thin plies indicates their effectiveness in resisting helium flow through the thickness under uniaxial strain.

Figure 12A:
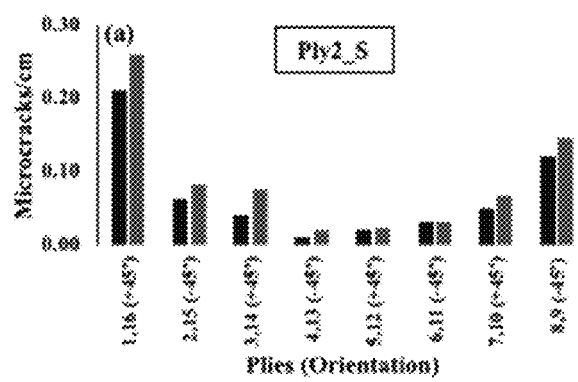
FIGS. 12A-D show the ply-by-ply midspan microcrack density in composite specimens after 20 thermo-mechanical cycles. (A) Ply2_S specimen. (B) Midplane_S specimen. (C) Surface_S specimen. (D) Control_S specimen.
Figure 12B:
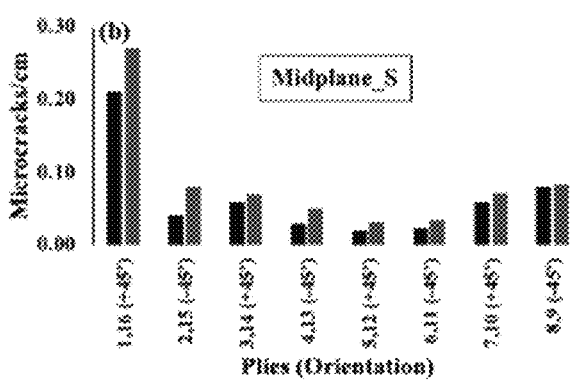
Figure 12C:
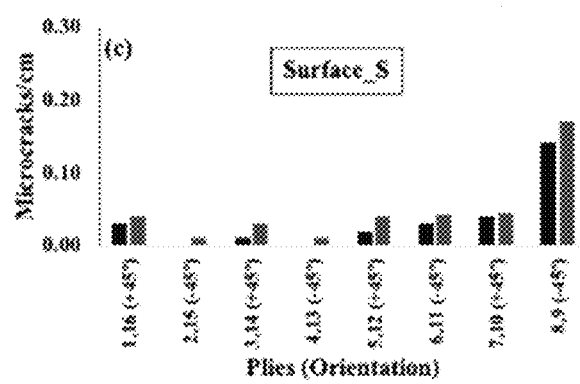
Figure 12D:
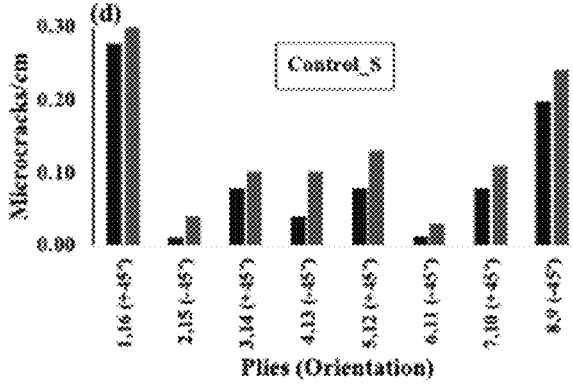
Figures 13A, 13B, 13C:
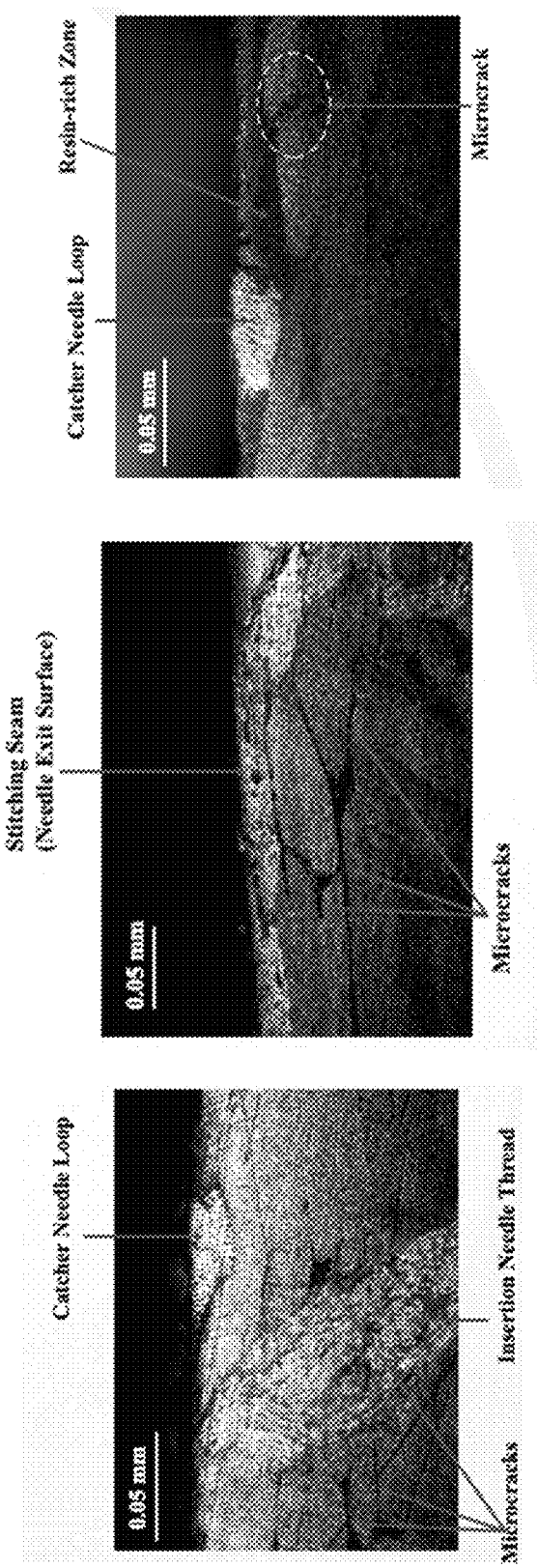
FIGS. 13A-C show images illustrating the cross-sectional views of (A) Ply2_S, (B) Control_S, and (C) Midplane_S showing cracks developing from the resin-rich areas around stitch seams.
Figure 14B:
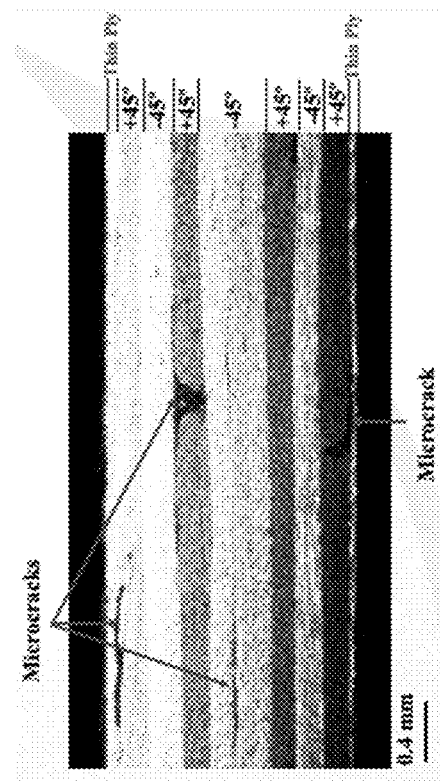
FIGS. 14A-B show images illustrating transverse microcracks being deflected by thin plies in (A) Midplane_S and (B) Surface_S.
Figure 14A:
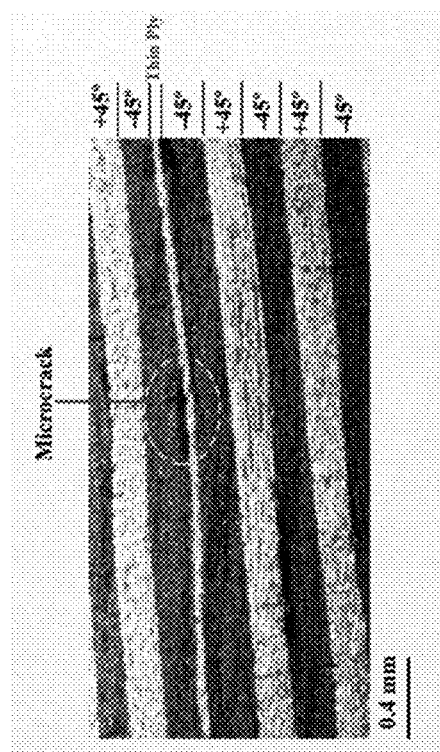

Micro-Crack Density of Specimens Under Uniaxial Thermo-Mechanical Cycling with Thin Plies Ply-level transverse microcracks were observed at 225× magnification using a stereo optical microscope. Transverse midspan microcrack densities were measured after 20 thermo-mechanical cycles, as shown in FIGS. 12A-D. Microcrack densities of plies symmetric about the midplane of the laminate were averaged. Cracks were included in the measurement if they extended at least three-quarters of the ply thickness. The results indicate that microcrack densities in the midspan region are always greater for all stitched specimens. The stitched control specimen (with no barrier layer) had the most internal damage when compared to stitched specimens with barrier layers. No cracks were observed to penetrate through the thin plies in any of the specimens with embedded thin plies. Even though thin plies were effective in reducing the microcrack propagation in these specimens when compared to the control specimen, internal cracking was observed in ply groups that had minimal edge microcracking, as seen in FIGS. 12A-B. Similar behavior was observed in specimens with thin plies on the surface where internal ply groups developed midspan transverse cracks that did not extend to the free edges, as seen in FIG. 12C. This may be due to cracks developing in the resin rich areas around the stitch seams, as seen in FIGS. 13A-C. These brittle zones are due to the stitching process which displaces fibers that become cured resin-filled areas around the stitches. Thus, cracks can propagate through the specimen, causing increased microcracking in the midspan region. This increases the permeability of stitched specimens with embedded thin plies compared to those with thin plies on the surface, for which microcracks were observed in several ply groups in the midspan region. However, no cracks were observed to penetrate through the thin ply in any specimen, as seen in FIGS. 14A-B. The thin plies on the surface acted as an integral liner, preventing excessive gas flow through the stitched composite, as seen in FIG. 14B. Overall, embedded thin plies were effective in resisting microcrack growth in the acreage portion of the specimens away from the stitching zone, while thin plies on the surface with no stitching, were effective over the entire area of the specimen.

Figure 15:
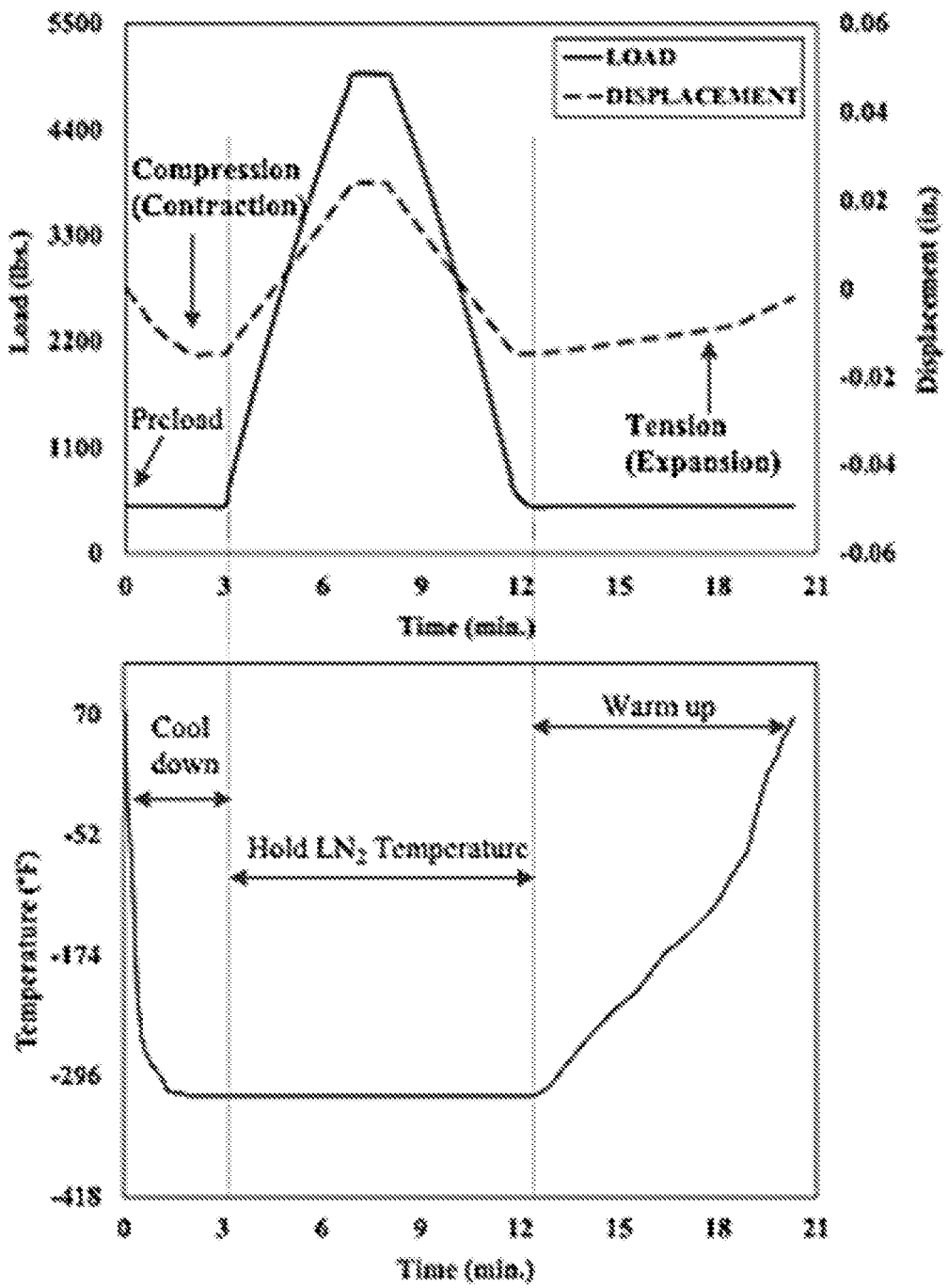
FIG. 15 shows graphs illustrating the load, displacement, and temperature data from Cycle 1 for specimens with hybrid barrier layers.

Results: Uniaxial Thermo-Mechanical Specimens with Nanographene and Thin Plies as Barrier Layers Load, Displacement and Temperature Profile—Barrier Layer: Nanographene and Thin Ply The average load, displacement, and temperature data for a thermo-mechanical cycle for specimen types 5 and 6 are shown in FIG. 15. The indicated displacement was measured at the base of the hydraulic piston and included deformation in the entire load train. During the first 3 minutes of a thermo-mechanical cycle, the load level was held constant at 500 lbs. while the ambient temperature of the specimen was decreased to −196° C. The displacement decreased to −0.0149 in. due to the thermally induced contractions in the test specimen. Approximately six minutes into the cycle, the load was increased to a peak value of ~4980 lbs. and held for one minute, producing a peak displacement of 0.0241 in. The load was then reduced to 500 lbs. and held until the specimen reached room temperature.

Figure 16:
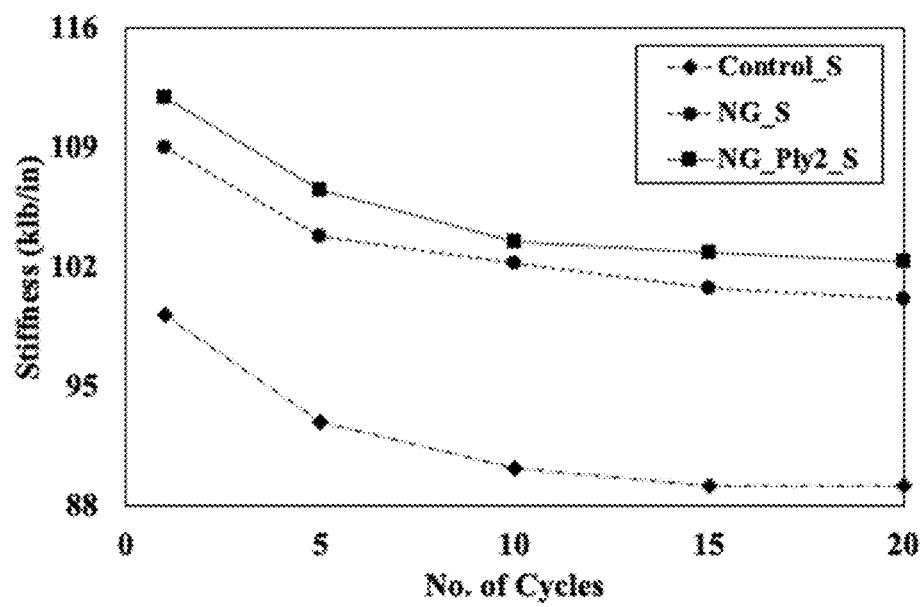
FIG. 16 shows a graph illustrating the stiffness of stitched composite specimens with hybrid barrier layers with increasing thermo-mechanical cycles.

Specimen stiffness as a function of thermo-mechanical cycles is shown in FIG. 16. Specimens NG_Ply2_S and NG_S had the highest stiffness, indicating that the inclusion of nanographene increases the stiffness of stitched composites. A higher stiffness was obtained for NG_Ply2_S, which contains a thin ply as compared to NG_S. A reduction in stiffness with increasing cycles is observed for all specimens with Control_S having the lowest stiffness. Maximum reduction in stiffness for all specimens is observed within the first five thermo-mechanical cycles. However, nanographene toughened specimens underwent a smaller reduction in stiffness when compared to specimens with thin plies.

Gas Permeability Performance of Specimens with Nanographene

Figure 17:
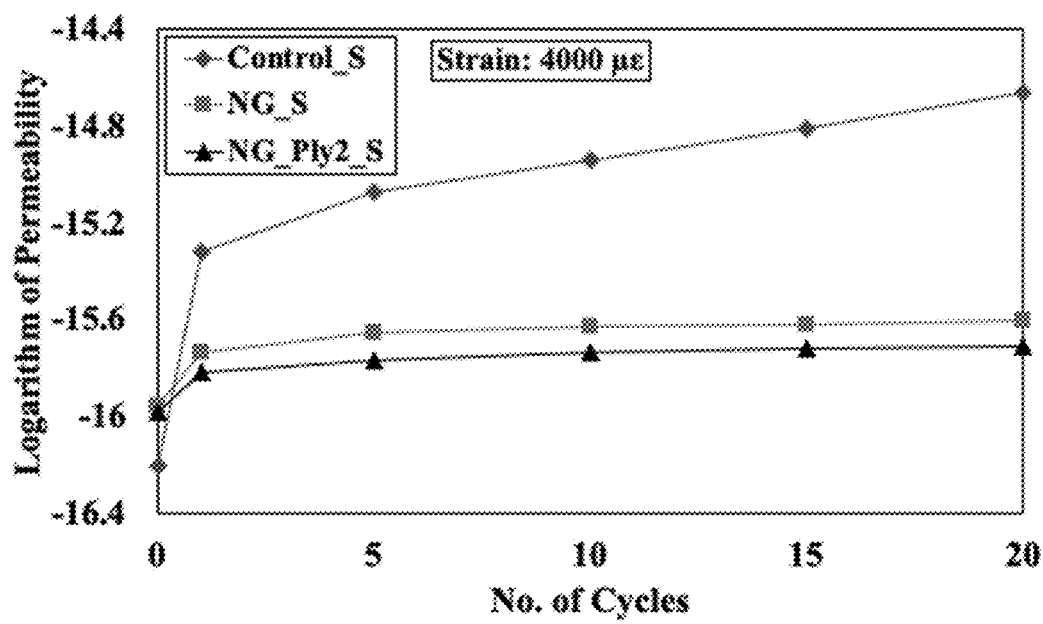
FIG. 17 shows a graph illustrating the logarithm of permeability as a function of thermo-mechanical cycles at 4000με for specimens with hybrid barrier layers.

Gas permeability of specimen types 1, 5, and 6 as a function of thermo-mechanical cycles at a strain level of 4000με is shown in FIG. 17. Gas permeability is observed to increase with thermo-mechanical cycles for all specimens. Control_S had the highest permeability and the highest rise in permeability after 20 cycles when compared to specimens with thin plies as barrier layers. The control specimen shows a sharp increase in permeability after the first cryogenic cycle, whereas this behavior is absent in specimens with barrier layers. Specimens with a thin ply and nanographene (NG_Ply2_S) have minimal change in permeability followed by specimens with just nanographene as a barrier layer.

Figure 18A:
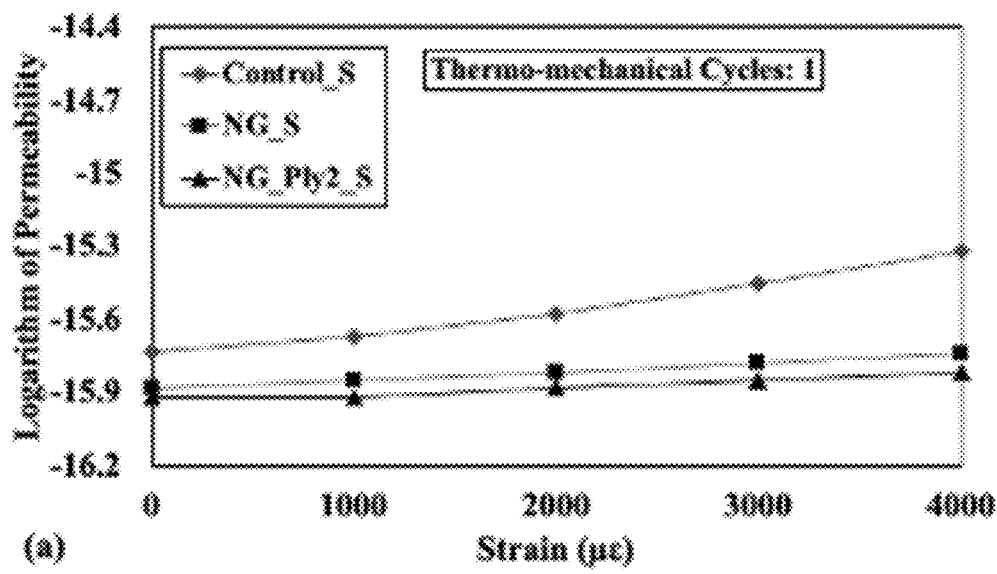
FIGS. 18A-B show the logarithm of permeability as a function of strain at (A) 1 cycle and (B) 20 cycle for specimens with hybrid barrier layers.
Figure 18B:
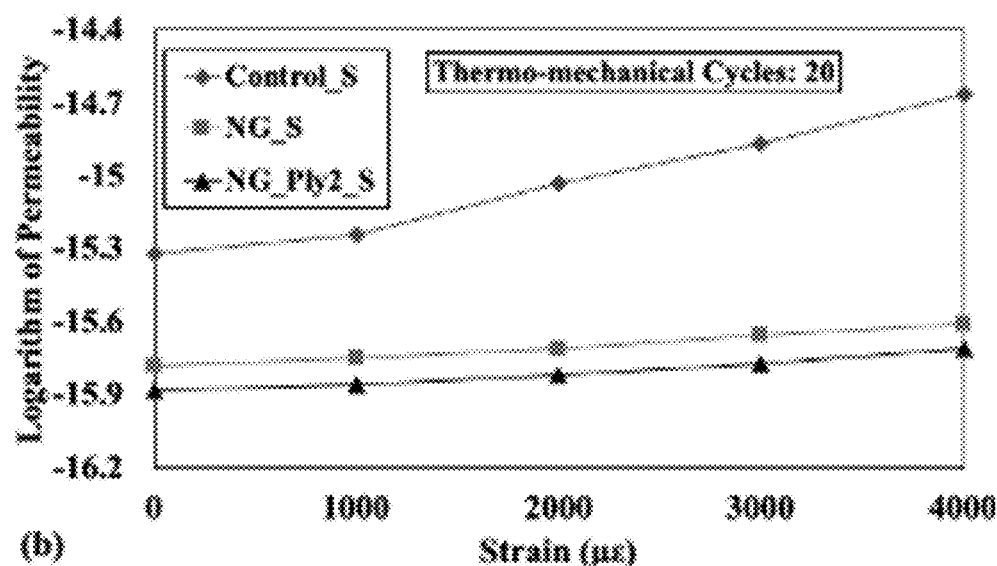

Gas permeability as a function of strain for all nanographene specimens is shown after thermo-mechanical cycle 1 and cycle 20 in FIGS. 18A and B, respectively. Results indicate that permeability is dependent on the applied mechanical strain for all composite specimens. Permeability is observed to increase with increasing mechanical strain and generally follows a linear relationship. Control_S had the highest rise in permeability with increasing strain when compared to specimens with thin plies. Minimal change in permeability for specimens with hybrid barrier layer indicates their effectiveness in resisting helium flow through the thickness under uniaxial strain.

Figures 19, 20:
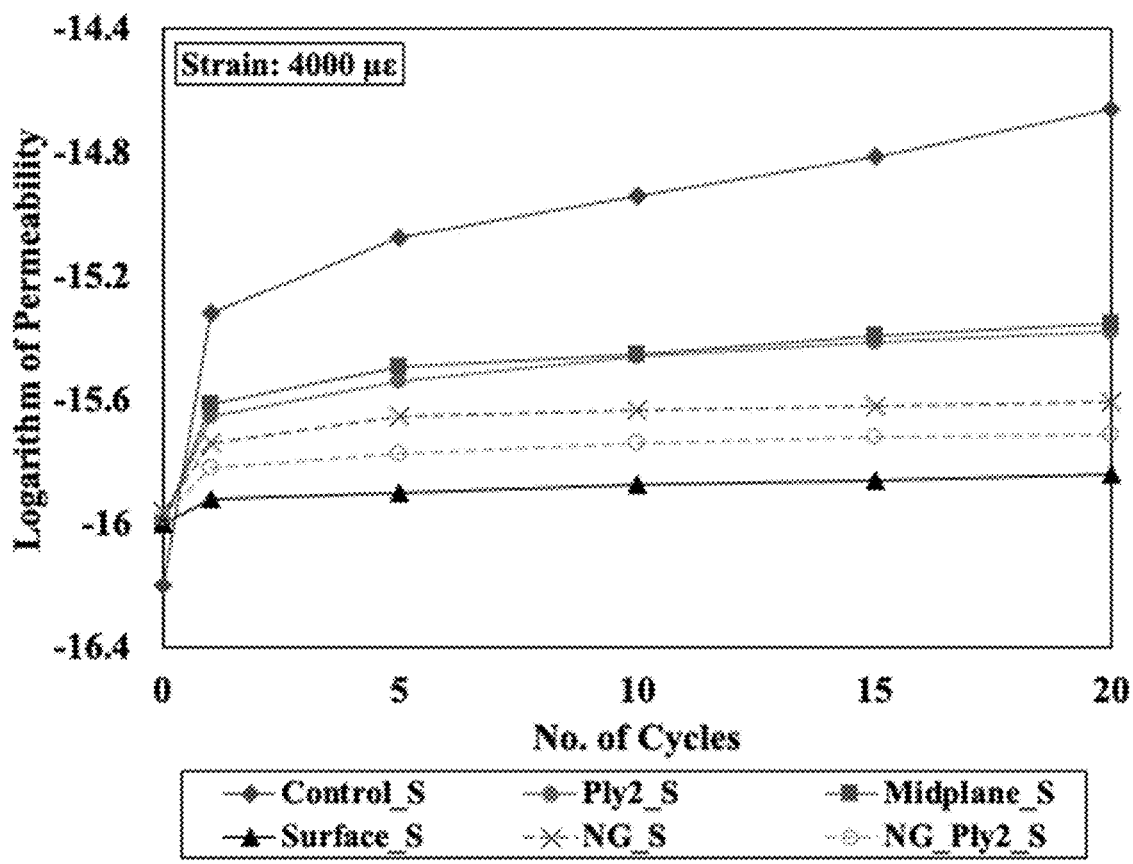
FIG. 19 shows a graph illustrating the logarithm of permeability as a function of thermo-mechanical cycles at 4000με for all specimens.
FIG. 20 shows the maximum allowable permeability rates for launch vehicle operations.

FIG. 19 shows the logarithm of permeability as a function of thermo-mechanical cycles at a constant strain level of 4000με for all specimen types. Surface_S had the lowest permeability followed by NG_Ply2_S, and NG_S. Specimens with embedded thin plies had a similar permeability response with higher permeation when compared to the nanographene specimens. However, in comparison to the control, specimens with barrier layers performed significantly better in resisting gas flow through the thickness with increasing thermo-mechanical cycles under mechanical strains.

Measured Gas Permeability vs Permeability Allowable

Figure 21:
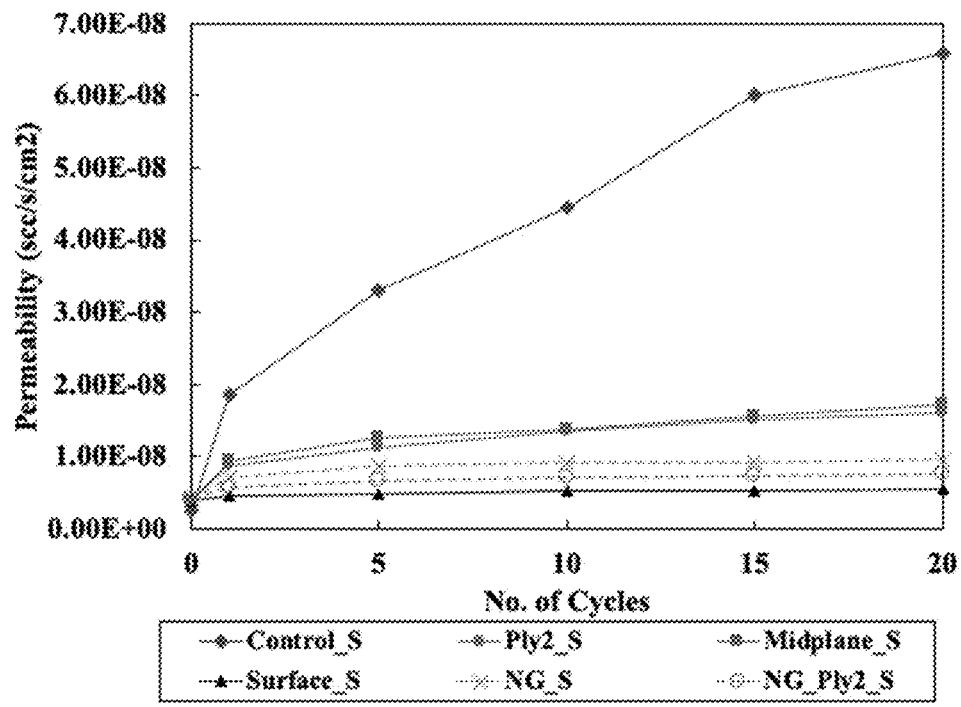
FIG. 21 shows a graph illustrating the leak rate as a function of thermo-mechanical cycles at 4000με for all specimens.

Robinson [30] developed a method to determine allowable hydrogen permeation rates for composite cryogenic tanks for launch vehicles. Various tank designs and permeation failure modes were considered in the calculations, as shown in FIG. 20. Permeability was calculated as a rate of gas loss in $scc/s/cm^2$. Since a direct comparison between permeability and rate of gas loss is not possible, measured permeability values for all specimens at 4000µε as a function of thermo-mechanical cycles were converted into units of gas loss rate and are shown in FIG. 21. Results indicate that the gas permeability rates of specimens with barrier layers are lower than that of control specimens. Specimens with thin plies on the surface had the lowest rate followed by specimens with hybrid barrier layers. It is evident from the results that a proper choice of barrier layer in the design of composite cryogenic tank can reduce gas permeability by a significant amount with increasing thermo-mechanical cycles.

Figure 22:
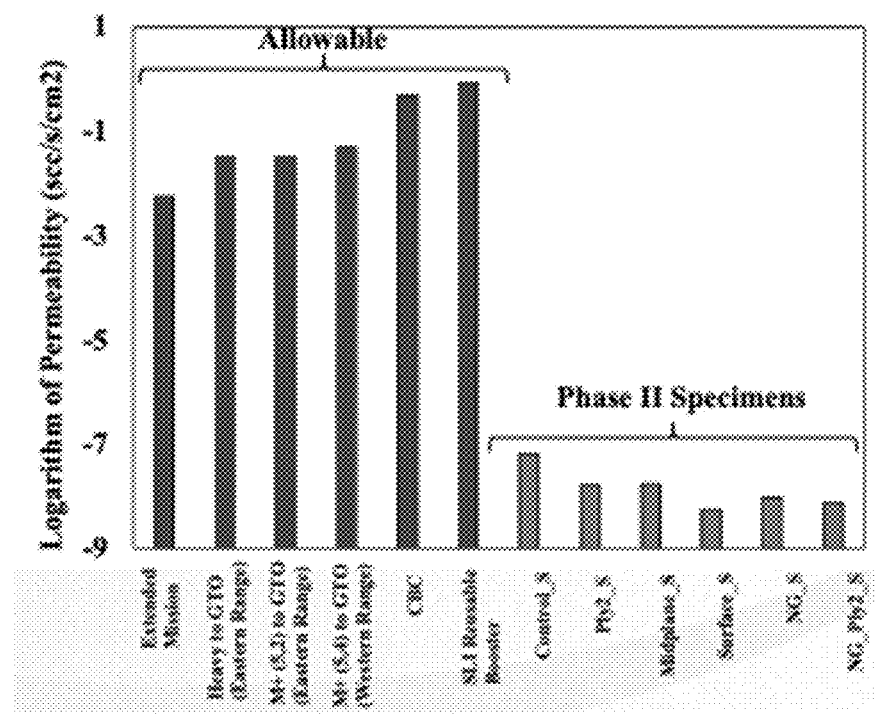
FIG. 22 shows a graph illustrating the permeability allowable vs. permeability of all tested specimens with barrier layers.

FIG. 22 compares the permeability rates of specimens at 4000µε after 20 thermo-mechanical cycles to the hydrogen leak rate allowable calculated by Robinson. The results show that the allowable leak rates are much higher than actual measured permeability of composite specimens. Gas permeability of specimens with barrier layers are lower than the allowable by at least five orders of magnitude on an average. In the case of Delta IV upper stages, permeability allowable is six times higher. However, it is noted that the hydrogen leak rate allowable is based on a state of biaxial stress within the composites. Therefore, it is expected that the permeability of specimens with barrier layers will increase under biaxial stresses and the gaps between the allowable an actual measure permeability numbers will not be as large as observed in this case. However, even with a biaxial stress being applied to the composites, it is not likely that permeability numbers will increase by five orders of magnitude. Therefore, the choice of barrier layers show promise in keeping the gas permeability of composites lower than the allowable.

CONCLUSIONS 3D stitched composites with barrier layers were thermo-mechanically cycled and tested for helium permeation at room temperature under uniaxial loads. Control specimen without any barrier layers had the highest permeability and the highest rise in permeability after 20 cycles when compared to specimens with barrier layers. Specimens with thin plies on the surface had the lowest permeability followed by specimens with a combination of thin ply and nanographene as a barrier layer. Specimens with just embedded thin plies had a similar permeability response with higher permeation rate compared to specimens with nanographene and thin ply as barrier layers. However, in comparison to the control, specimens with barrier layers performed significantly better in resisting gas flow through the thickness with increasing thermo-mechanical cycles under mechanical strains. Measured permeability values were compared to the allowable calculated by Robinson. Gas permeability of specimens with barrier layers were lower than the allowable by at least five orders of magnitude on an average, which shows that the effectiveness of barrier layers in keeping the gas permeability of composites lower than the allowable.

REFERENCES

All patents, patent applications, published applications and publications, GenBank sequences, databases, websites, and other published materials referred to throughout this specification are, unless noted otherwise, incorporated by reference to the same extent as if each was specifically and individually indicated to be incorporated by reference, including the references set forth in the following list:

[1] H. Kevin, Cyclic Cryogenic Testing of an X-33/RLV Liquid Oxygen Tank Concept, Hampton, Virginia, 1999.

[2] M. Robinson, J. Eichinger, S. Johnson, Hydrogen Permeability Requirements and Testing for Reusable Launch Vehicle Tanks, in: 43rd AIAA/ASME/ASCE/AHS/ASC Structures, Structural Dynamics, and Materials Conference, American Institute of Aeronautics and Astronautics, 2002.

[3] D. A. McCarville, J. C. Guzman, A. K. Dillon, J. R. Jackson, J. O. Birkland, Design, manufacture and test of cryotank components, in: Comprehensive Composite Materials II, Elsevier, 2018: pp. 153-179. https://doi.org/10.1016/B978-0-12-803581-8.09958-6.

[4] M. Robinson, S. Johnson, M. Hand, J. Eichinger, M. Hand, E. Sorensen, Trade Study Results for a Second-Generation Reusable Launch Vehicle Composite Hydrogen Tank, in: 45th AIAA/ASME/ASCE/AHS/ASC Structures, Structural Dynamics & Materials Conference, American Institute of Aeronautics and Astronautics, 2004. https://doi.org/doi:10.2514/6.2004-1932.

[5] D. Achary, R. Biggs, C. Bouvier, M. McBain, W. Lee, Composite Development and Applications for Cryogenic Tankage, in: 46th AIAA/ASME/ASCE/AHS/ASC Structures, Structural Dynamics and Materials Conference, American Institute of Aeronautics and Astronautics, 2005. https://doi.org/doi:10.2514/6.2005-2160.

[6] V. T. Bechel, R. Y. Kim, Damage trends in cryogenically cycled carbon/polymer composites, Composites Science and Technology. 64 (2004) 1773-1784. https://doi.org/10.1016/J.COMPSCITECH.2003.12.007.

[7] A. Nettles, E. Biss, Low Temperature Mechanical Testing of Carbon-Fiber/Epoxy-Resin Composite Materials, (1996).

[8] C. H. Park, H. L. McManus, Thermally induced damage in composite laminates: Predictive methodology and experimental investigation, Composites Science and Technology. 56 (1996) 1209-1219. https://doi.org/https://doi.org/10.1016/S0266-3538(96)00089-9.

[9] H. K. Rivers, J. G. Sikora, S. N. Sankaran, Detection of Hydrogen Leakage in a Composite Sandwich Structure at Cryogenic Temperature, Journal of Spacecraft and Rockets. 39 (2002) 452-459. https://doi.org/10.2514/2.3829.

[10] R. W. Grenoble, T. S. Gates, Hydrogen Permeability of Polymer Matrix Composites at Cryogenic Temperatures, 46th AIAA/ASME/ASCE/AHS/ASC Structures, Structural Dynamics and Materials Conference. (2005). http://search.ebscohost.com/login.aspx?direct=true&AuthType=ip,shib&db=edsnas&AN=edsnas.20050199401&site=eds-live&custid=magn1307.

[11] K. Mallick, J. Cronin, K. Ryan, S. Arzberger, N. Munshi, C. Paul, J. Welsh, An Integrated Systematic Approach to Linerless Composite Tank Development, in: 46th AIAA/ASME/ASCE/AHS/ASC Structures, Structural Dynamics and Materials Conference, American

[12] S. Disdier, J. M. Rey, P. Pailler, A. R. Bunsell, Helium permeation in composite materials for cryogenic application, Cryogenics. 38 (1998) 135-142. https://doi.org/10.1016/S0011-2275(97)00124-0.

[13] V. T. Bechel, M. Negilski, J. James, Limiting the permeability of composites for cryogenic applications, Composites Science and Technology. 66 (2006) 2284-2295. https://doi.org/10.1016/J.COMPSCITECH.2005.12.003.

[14] A. T. Nettles, Permeability Testing of Composite Material Adhesive Bonds for the DC-XA Composite Feedline Program, Huntsville, Alabama, 1995.

[15] A. T. Nettles, Permeability Testing of Impacted Composite Laminates for Use on Reusable Launch Vehicles, Huntsville, Alabama, 2001.

[16] S. Choi, B. v. Sankar, Gas permeability of various graphite/epoxy composite laminates for cryogenic storage systems, Composites Part B: Engineering. 39 (2008) 782-791. https://doi.org/10.1016/J.COMPOSITESB.2007.10.010.

[17] H. Hamori, H. Kumazawa, R. Higuchi, T. Yokozeki, Numerical and experimental evaluation of the formation of leakage paths through CFRP cross-ply laminates with leak barrier layers, Composite Structures. 230 (2019) 111530. https://doi.org/https://doi.org/10.1016/j.compstruct.2019.111530.

[18] H. Hamori, H. Kumazawa, R. Higuchi, T. Yokozeki, Gas permeability of CFRP cross-ply laminates with thin-ply barrier layers under cryogenic and biaxial loading conditions, Composite Structures. 245 (2020) 112326. https://doi.org/https://doi.org/10.1016/j.compstruct.2020.112326.

[19] H. Kumazawa, T. Aoki, I. Susuki, Analysis and Experiment of Gas Leakage Through Composite Laminates for Propellant Tanks, AIAA Journal. 41 (2003) 2037-2044. https://doi.org/10.2514/2.1895.

[20] H. Kumazawa, H. Hayashi, I. Susuki, T. Utsunomiya, Damage and permeability evolution in CFRP cross-ply laminates, Composite Structures. 76 (2006) 73-81. https://doi.org/https://doi.org/10.1016/j.compstruct.2006.06.011.

[21] T. Yokozeki, T. Ogasawara, T. Aoki, T. Ishikawa, Experimental evaluation of gas permeability through damaged composite laminates for cryogenic tank, Composites Science and Technology. 69 (2009) 1334-1340. https://doi.org/https://doi.org/10.1016/j.compscitech.2008.05.019.

[22] S. Saha, R. W. Sullivan, M. L. Baker, Gas permeability of three-dimensional stitched carbon/epoxy composites for cryogenic applications, Composites Part B: Engineering. (2021) 108847. https://doi.org/https://doi.org/10.1016/j.compositesb 0.2021.108847.

[23] V. T. Bechel, M. B. Fredin, S. L. Donaldson, R. Y. Kim, J. D. Camping, Effect of stacking sequence on microcracking in a cryogenically cycled carbon/bismaleimide composite, Composites Part A: Applied Science and Manufacturing. 34 (2003) 663-672. https://doi.org/10.1016/S1359-835X(03)00054-X.

[24] V. Kinra, D. Lagoudas, J. Whitcomb, Mechanical Characterization and Ultrasonic NDE of Cryogenic Composites, in: 44th AIAA/ASME/ASCE/AHS/ASC Structures, Structural Dynamics, and Materials Conference, American Institute of Aeronautics and Astronautics, 2003. https://doi.org/doi:10.2514/6.2003-1433.

[25] S. Kumagai, Y. Shindo, A. Inamoto, Tension—tension fatigue behavior of GFRP woven laminates at low temperatures, Cryogenics. 45 (2005) 123-128. https://doi.org/https://doi.org/10.1016/j.cryogenics.2004.06.006.

[26] P. Peddiraju, J. Noh, J. Whitcomb, D. C. Lagoudas, Prediction of Cryogen Leak Rate through Damaged Composite Laminates, Journal of Composite Materials. 41 (2006) 41-71. https://doi.org/10.1177/0021998306063352.

[27] S. Roy, M. Benjamin, Modeling of permeation and damage in graphite/epoxy laminates for cryogenic fuel storage, Composites Science and Technology. 64 (2004) 2051-2065. https://doi.org/10.1016/J.COMPSCITECH.2004.02.014.

[28] A. Nair, S. Roy, Modeling of permeation and damage in graphite/epoxy laminates for cryogenic tanks in the presence of delaminations and stitch cracks, Composites Science and Technology. 67 (2007) 2592-2605. https://doi.org/10.1016/J.COMPSCITECH.2006.12.003.

[29] M. Yuan, H. Zhao, L. Tian, B. Zhang, Y. Yang, J. Chen, J. Chen, Crack density-based semi-quantitative estimation for leak rate of composite laminates with thin-plies, Composites Science and Technology. 200 (2020) 108416. https://doi.org/https://doi.org/10.1016/j.compscitech.2020.108416.

[30] R. J. Werlink, F. Pena, NASA Prototype All Composite Tank Cryogenic Pressure Tests to Failure with Structural Health Monitoring, in: 10th International Workshop on Structural Health Monitoring, Stanford, CA, 2015: p. 11.

[31] R. A. Crick, D. C. Leach, P. J. Meakin, D. R. Moore, Interlaminar fracture morphology of carbon fibre/PEEK composites, Journal of Materials Science. 22 (1987) 2094-2104. https://doi.org/10.1007/BF01132945.

[32] H. Yoon, K. Takahashi, Mode I interlaminar fracture toughness of commingled carbon fibre/PEEK composites, Journal of Materials Science. 28 (1993) 1849-1855. https://doi.org/10.1007/BF00595757.

[33] Md. S. Islam, E. Melendez-Soto, A. G. Castellanos, P. Prabhakar, Investigation of woven composites as potential cryogenic tank materials, Cryogenics. 72 (2015) 82-89. https://doi.org/10.1016/J.CRYOGENICS.2015.09.005.

[34] M. Flanagan, D. M. Grogan, J. Goggins, S. Appel, K. Doyle, S. B. Leen, C. M. 6 Bradaigh, Permeability of carbon fibre PEEK composites for cryogenic storage tanks of future space launchers, Composites Part A: Applied Science and Manufacturing. 101 (2017) 173-184. https://doi.org/10.1016/J.COMPOSITESA.2017.06.013.

[35] V. Bechel, R. Kim, S. Donaldson, Composites Containing Barrier Layers for Reduced Permeability at Cryogenic Temperature, in: 47th AIAA/ASME/ASCE/AHS/ASC Structures, Structural Dynamics, and Materials Conference, American Institute of Aeronautics and Astronautics, Rhode Island, 2006. https://doi.org/doi:10.2514/6.2006-2092.

[36] A. S. D. Wang, F. W. Crossman, Initiation and Growth of Transverse Cracks and Edge Delamination in Composite Laminates Part 1. An Energy Method, Journal of Composite Materials. 14 (1980) 71-87. https://doi.org/10.1177/002199838001400106.

[37] F. W. Crossman, W. J. Warren, A. S. D. Wang, G. E. Law, Initiation and Growth of Transverse Cracks and Edge Delamination in Composite Laminates Part 2. Experimental Correlation, Journal of Composite Materials. 14 (1980) 88-108. https://doi.org/10.1177/002199838001400107.

[38] S. Cook, X-33 reusable launch vehicle structural technologies, in: Space Plane and Hypersonic Systems and Technology Conference, American Institute of Aeronautics and Astronautics, 1996. htttps://doi.org/doi:10.2514/6.1996-4563.

[39] S. Saha, R. W. Sullivan, Strain distributions in bonded composites using optical fibers and digital image correlation, in: Proceedings of the American Society for Composites—34th Technical Conference, ASC 2019, 2019.

[40] A. Shah, S. Saha, R. W. Sullivan, Investigation of composite bond thickness using optical fibers, in: Proceedings of the American Society for Composites—34th Technical Conference, ASC 2019, 2019. https://doi.org/10.12783/asc34/31416.

[41] KSL, (n.d.). http://www.ksl-lorsch.de/en/home/ (accessed Jun. 21, 2020).

[42] ASTM D1434-82 (2015) e1. Standard Test Method for Determining Gas Permeability Characteristics of Plastic Film and Sheeting, ASTM International, West Conshohocken, PA (2015).

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A stitched polymer matrix composite for cryogenic applications, the polymer matrix composite comprising:
   a stitched composite, comprising:
      two or more plies:
      at least one thin ply having a thickness of up to 0.05 mm;
      stitching disposed across a through-thickness of the stitched composite to provide a stitched preform; and
      a nanographene dispersed resin infused into the stitched preform after the stitching;
   wherein the at least one thin ply is disposed at one or both of a surface of the stitched composite and between the two or more plies; and
   further wherein the at least one thin ply and the infused nanographene dispersed resin create a hybrid barrier layer which provides the stitched polymer matrix composite with enhanced resistance to microcracking and reduced gas permeability during thermal cycling.

2. The polymer matrix composite of claim 1, wherein at least one of the two or more plies of the stitched composite comprises a fabric.

3. The polymer matrix composite of claim 2, wherein the fabric is a non-crimp fabric.

4. The polymer matrix composite of claim 2, wherein the fabric is of any orientation.

5. The polymer matrix composite of claim 2, wherein the fabric includes an intermediate modulus fiber or a standard modulus fiber.

6. The polymer matrix composite of claim 1, wherein the nanographene dispersed resin comprises an out-of-autoclave epoxy.

7. The polymer matrix composite of claim 1, wherein the nanographene dispersed resin includes a nanographene volume fraction of about 0.5% to about 10.0% by weight of the resin.

8. The polymer matrix composite of claim 1, wherein the at least one thin ply is incorporated on the surface of the stitched composite.

9. The polymer matrix composite of claim 1, wherein the at least one thin ply is incorporated between the two or more plies of the stitched composite.

10. The polymer matrix composite of claim 9, wherein the at least one thin ply is incorporated between a second composite ply from the surface of the polymer matrix composite and a third composite ply from the surface of the polymer matrix composite.

11. The polymer matrix composite of claim 9, wherein the at least one thin ply is incorporated at a midplane of the stitched composite.

12. The polymer matrix composite of claim 1, wherein the at least one thin ply is a dry thin ply.

13. The polymer matrix composite of claim 1, further comprising at least one additional thin ply.

14. The polymer matrix composite of claim 13, wherein the at least one additional thin ply is incorporated between plies of the stitched composite.

15. A high-pressure composite cryogenic tank comprising the polymer matrix composite of claim 1.

16. The cryogenic tank of claim 15, wherein the cryogenic tank comprises a unitized structure.

17. A method of fabricating the stitched polymer matrix composite of claim 1, the method comprising:
   positioning a dry thin ply between composite plies of the polymer matrix composite;
   stitching the composite plies across a through-thickness of the polymer matrix composite to form a stitched preform;
   dispersing the nanographene into an epoxy to provide a nanographene-dispersed resin; and
   infusing the stitched preform with the nanographene-dispersed resin.

18. The method of claim 17, wherein the composite plies include fabric.

19. The method of claim 17, wherein infusing the stitched preform with the resin comprises vacuum assisted resin transfer molding.

* * * * *